United States Patent
Kincaid

(10) Patent No.: US 7,879,541 B2
(45) Date of Patent: Feb. 1, 2011

(54) APPARATUS AND METHODS OF DETECTING FEATURES ON A MICROARRAY

(75) Inventor: Robert H. Kincaid, Half Moon Bay, CA (US)

(73) Assignee: Agilent Technologies, Inc., Santa Clara, CA (US)

( * ) Notice: Subject to any disclaimer, the term of this patent is extended or adjusted under 35 U.S.C. 154(b) by 1632 days.

(21) Appl. No.: 10/422,163

(22) Filed: Apr. 24, 2003

(65) Prior Publication Data

US 2003/0186310 A1 Oct. 2, 2003

Related U.S. Application Data

(62) Division of application No. 09/697,875, filed on Oct. 26, 2000, now abandoned.

(51) Int. Cl.
*C12Q 1/68* (2006.01)
*G01N 35/00* (2006.01)
*G01N 21/00* (2006.01)
(52) U.S. Cl. .............................. 435/6; 436/46; 422/55
(58) Field of Classification Search .................. 435/6, 435/287.1, 287.2; 436/46; 422/55
See application file for complete search history.

(56) References Cited

U.S. PATENT DOCUMENTS

| | | | |
|---|---|---|---|
| 5,141,609 A * | 8/1992 | Sweedler et al. ............. | 204/452 |
| 5,143,854 A * | 9/1992 | Pirrung et al. ............... | 436/518 |
| 5,508,178 A | 4/1996 | Rose et al. | |
| 5,578,832 A | 11/1996 | Trulson et al. | |
| 5,585,639 A | 12/1996 | Dorsel et al. | |
| 5,721,435 A | 2/1998 | Troll | |
| 5,760,951 A | 6/1998 | Dixon et al. | |
| 5,763,870 A | 6/1998 | Sadler et al. | |
| 5,800,992 A | 9/1998 | Fodor et al. | |
| 5,856,174 A | 1/1999 | Lipshutz et al. | |
| 5,945,334 A * | 8/1999 | Besemer et al. ............ | 435/287.2 |
| 5,955,268 A * | 9/1999 | Granados et al. ............... | 435/6 |

(Continued)

FOREIGN PATENT DOCUMENTS

WO WO 97/27317 7/1997

(Continued)

OTHER PUBLICATIONS

Erik Gentalen and Mark Chee, "A Novel Method for Determining Linkage Between DNA Sequences: Hybridization to Paired Probe Arrays", Nucleic Acids Research, 1999, vol. 27, No. 6, pp. 1485-1491.

*Primary Examiner*—Robert T. Crow

(57) ABSTRACT

A method of making a microarray apparatus with enhanced feature detectability provides for accurate detection of each feature location, regardless of the quality or quantity of signals from hybridized oligomer test probes. The method comprises separately providing a control probe or stilt and an oligomer test probe at each feature location on the microarray, such that each feature comprises a control probe and a test probe. The control probe comprises a sequence of nucleic acids unique to the control probe. The control probe is labeled with a label that emits a control signal. The oligomer test probe is labeled with a test label that emits a test signal distinguishable from the control signal. When the microarray is hybridized and interrogated, the control signal indicates the location of each and every feature on the array and the test signal indicates the location of hybridized oligomer test probes.

10 Claims, 5 Drawing Sheets

U.S. PATENT DOCUMENTS

| | | | |
|---|---|---|---|
| 5,962,225 A * | 10/1999 | Ramberg | 435/6 |
| 5,981,956 A * | 11/1999 | Stern | 250/458.1 |
| 6,045,996 A | 4/2000 | Cronin et al. | |
| 6,086,190 A * | 7/2000 | Schantz et al. | 347/81 |
| 6,245,518 B1 | 6/2001 | Baier | |
| 6,284,465 B1 | 9/2001 | Wolber | |
| 6,306,643 B1 | 10/2001 | Gentalen et al. | |
| 6,344,316 B1 | 2/2002 | Lockhart et al. | |
| 6,355,431 B1 * | 3/2002 | Chee et al. | 435/6 |
| 6,362,004 B1 * | 3/2002 | Noblett | 436/43 |
| 2002/0051971 A1 * | 5/2002 | Stuelpnagel et al. | 435/6 |

FOREIGN PATENT DOCUMENTS

| | | |
|---|---|---|
| WO | WO 00/11223 | 3/2000 |
| WO | WO 00/34523 | 6/2000 |

* cited by examiner

APPARATUS AND METHODS OF DETECTING FEATURES ON A MICROARRAY

This is a Divisional application Ser. No. 09/697,875, filed on Oct. 26, 2000 now abandoned, the entire disclosure of which is incorporated herein by reference.

TECHNICAL FIELD

This invention relates to analysis of microarrays. In particular, the invention relates to extracting signal data from microarray features.

BACKGROUND ART

Microarrays of biomolecules, such as DNA, RNA, cDNA, polynucleotides, oligonucleotides ("oligomers"), proteins, and the like, are state-of-the-art biological tools used in the investigation and evaluation of biological processes, including gene expression, for analytical, diagnostic, and therapeutic purposes. Microarrays typically comprise a plurality of polymers, e.g., oligomers, synthesized in situ or presynthesized and deposited on a substrate in an array pattern. Microarrays of oligomers manufactured by solid-phase DNA synthesis can have oligomer densities approaching $10^6$/micron$^2$. As used herein, the support-bound oligomers are called "probes", which function to bind or hybridize with a sample of DNA or RNA material under test, called a "target" in hybridization experiments. However, some investigators also use the reverse definitions, referring to the surface-bound oligonucleotides as targets and the solution sample of nucleic acids as probes. Further, some investigators bind the target sample under test to the microarray substrate and put the oligomer probes in solution for hybridization. Either of the "target" or "probes" may be the one that is to be evaluated by the other (thus, either one could be an unknown mixture of polynucleotides to be evaluated by binding with the other). All of these iterations are within the scope of this discussion herein. For the purpose of simplicity only, herein the probe is the surface-bound oligonucleotide of known sequence and the target is the moiety in a mobile phase (typically fluid), to be detected by the surface-bound probes. The plurality of probes and/or targets in each location in the array is known in the art as a "nucleic acid feature" or "feature". A feature is defined as a locus onto which a large number of probes and/or targets all having the same nucleotide sequence are immobilized.

In use, the array surface is contacted with one or more targets under conditions that promote specific, high-affinity binding (i.e., hybridization) of the target to one or more of the probes. The target nucleic acids will hybridize with complementary nucleic acids of the known oligonucleotide probe sequences and thus, information about the target samples can be obtained. The targets are typically labeled with an optically detectable label, such as a fluorescent tag or fluorophore, so that the targets are detectable with scanning equipment after a hybridization assay. The targets can be labeled either prior to, during, or even after the hybridization protocol, depending on the labeling system chosen, such that the fluorophore will associate only with probe-bound hybridized targets.

After hybridization of the targets with the probe features, the array is analyzed by well-known methods. Hybridized arrays are often interrogated using optical methods, such as with a scanning fluorometer. A focused light source (usually a laser) is scanned across the hybridized array causing the hybridized areas to emit an optical signal, such as fluorescence. The fluorophore-specific fluorescence data is collected and measured during the scanning operation, and then an image of the array is reconstructed via appropriate algorithms, software and computer hardware. The expected or intended locations of probe nucleic acid features can then be combined with the fluorescence intensities measured at those locations, to yield the data that is then used to determine gene expression levels or nucleic acid sequence of the target samples. The process of collecting data from expected probe locations is referred to as "feature extraction". The conventional equipment and methods of feature extraction are limited by their dependence upon the expected or intended location of the probe features on the substrate array, which is subject to the accuracy of the microarray manufacturing equipment.

Depending on the make-up of the target sample, hybridization of probe features may or may not occur at all probe feature locations and will occur to varying degrees at the different probe feature locations. A general problem in the feature extraction process described above is the extraction of features having weak or low fluorescence intensities, called "dim features" (i.e. will display poor intensity contrast, relative to a background) due to little or no hybridization to the target sample at those locations.

One aspect of the feature extraction problem is the location of the dim feature. If the dim feature is not accurately located on the array substrate by the manufacturing process (i.e. the probe feature is misplaced or mislocated due to the manufacturing process), the computer will not count the dim feature and inaccurate data will result. Although, it is conventional practice to provide fiduciary markings on the array substrate, for example, to which the manufacturing equipment aligns each manufacturing step, errors in the location of the features still occur. The fiduciary markings are also used during feature extraction. The optical scanning equipment aligns the light source with the array fiduciary markings and the computer aligns its predefined region for detection and analysis with the fiduciary markings on the substrate surface.

Another aspect of the feature extraction problem occurs when the probe feature that produces a weak signal after hybridization is misshapen for some reason and the computer cannot detect the irregular shape, which results in inaccurate assessment of the degree of hybridization of target to the probe feature. The common source of misshapen features is in the manufacturing process. Common misshapen feature morphologies are annular features and football-shaped features. Other, more complex morphologies, such as crescents, and defects due to scratches on the substrate surface are also observed.

Still another aspect of the feature extraction problem occurs when there are variations in the diameter of the probe feature. Variations in the diameter of a feature may result from surface chemistry problems on the surface of the substrate, such as changes in hydrophobicity of the surface. A higher than expected surface hydrophobicity will result in the feature having a smaller footprint, since the feature tends to bead up more on the more hydrophobic substrate surface. Therefore, the feature might be located in the correct place, but be only one half to three quarters of the diameter than was expected (i.e. the error is greater than 10 percent of the diameter). When the computer samples the predefined region of interest, it collects non-probe feature data in addition to the feature signal. The feature signal is degraded by the additional data.

The primary difficulty lies in the ability to determine with a level of certainty the actual position of the probe feature that gives rise to the weak signal to ensure its detection by the optical scanning equipment. A dim feature that is not located on the substrate consistently within the array pattern, may be missed during the feature extraction process, if the analysis equipment or the operator does not know the likely locations of inconsistently placed features. Therefore, this limitation in the conventional equipment and method yields less accurate results when analyzing the fluorescence data for the composition of the target sample.

As mentioned above, the density of probes on a microarray chip is ever increasing so that more genes can be analyzed at one time and thus, saves sample and reduces costs. Achieving smaller and more compact arrays will depend heavily on the manufacturing equipment and processing. It should be appreciated that as probe arrays for gene analysis become more density packed, very small errors in probe placement more severely impact the accuracy of the analysis of the hybridization results.

The problem of locating inaccurately placed probe features that result in weak signals after hybridization becomes particularly difficult as feature size decreases, because the relative importance of location errors increases at the same time that the total number of pixels in the digital array image that contain relevant data is decreasing. Extracting signal data from microarray features requires various schemes of spot finding and detrending to compensate for both position defects during manufacturing, as well as variations which occur during hybridization (bubbles, focus artifacts, surface variations, etc.) and scanning (auto focus, glass flatness, etc.).

Methods to generally locate features on a substrate are disclosed in U.S. Pat. No. 5,721,435, issued to Troll and assigned to the assignee of the present invention, which is incorporated herein by this reference. The methods of Troll include a plurality of reference markings and test spots on an array, all of which produce signals when optically scanned that are detected and evaluated to determine the location of the test spots. The reference markings have optically unique signatures to distinguish them from the signals from the test spots. The reference markings are spaced apart at known distances and serve to provide a constant calibration for the scanning equipment. The reference markings are typically laser-etched or metal-plated alignment marks that are written to the substrate surface. This method of feature location is commonly referred to as "dead-reckoning" from a mixture of design parameters and physical landmarks.

Another method to generally locate features that can be used to locate dim features is user-assisted feature extraction ("by hand"). Although these methods work well to generally locate features on a substrate, without further intervention, they are not much better at locating dim features that are mislocated (i.e., not properly placed) on the substrate by the manufacturing equipment. Dead reckoning is degraded by both uncompensated systematic location errors and random location errors. Finally, user-assisted extraction is, by definition, subjective and not automated; it is also slow, tedious and subject to errors caused by user fatigue.

Thus, it would be advantageous to have an apparatus and method to accurately locate probe features on a microarray regardless of the quantity and/or quality of the of the target-specific or hybridized probe signal. Further, it would be advantageous if the apparatus and method could be used with conventional scanning and analysis equipment. Such an apparatus and method would be particularly useful as microarrays become more densely packed.

SUMMARY OF THE INVENTION

The present invention provides an apparatus and method for more accurately locating features on a microarray. The invention is not dependent on the quality of target-specific or hybridized probe signals to locate features and is readily adaptable for use with conventional scanning and analysis equipment.

In one aspect of the invention, a microarray apparatus with enhanced feature detectability is provided that comprises a control probe attached at one end to a surface of a microarray substrate in an array pattern of features on the microarray. The control probe comprises a known sequence of nucleic acids. Control probes are known in the art as probes of a specific, known sequence of nucleic acids in known quantity, that do not interfere with a hybridization assay of a target sample under test. In contrast to the conventional use of control probes, for the present invention, the control probe does not take up valuable real estate (i.e., dedicated features) on the microarray, but instead the control probe is populated on each feature of the microarray along with a respective oligomer test probe (described further below). When the control probe is labeled, the control label emits a specific signal upon excitation with light, such as when scanned with a microarray scanner. The signal emitted from the control label is distinguishable from any other signals that may be used on a hybridized or unhybridized microarray of oligomer test probes. As a result, the precise location of each and every feature in the microarray is separately detectable based on the signal emitted by the labeled control probe on each and every feature. The signal from the labeled control probe is advantageously detected in a separate channel of the detection portion of the scanning equipment, so not to interfere with conventional hybridization signals and detection channels.

The apparatus further comprises an oligomer test probe also located on each feature. Thus, the term "feature" for the purposes of the invention is defined as a locus comprising both a control probe and an oligomer test probe immobilized thereon. In a first embodiment of the apparatus, the oligomer test probe is attached to an opposite end of the control probe. In this embodiment, the control probe is referred to as a control stilt. The control stilt becomes an extension between the surface of the microarray substrate and the oligomer test probe. Advantageously in this embodiment, there is a 1:1 correspondence between the quantity of control stilt and the quantity of oligomer test probe. In a second embodiment, the oligomer test probe is attached to the substrate surface at each feature location. In this embodiment, there is no 1:1 correlation between quantities of control probe and oligomer test probe.

According to the apparatus of the invention, the control probe or stilt and the oligomer test probe each is associated with a label, namely a control label and a test label, respectively. The control label emits a signal that is different than a signal emitted by the test label, so that the signals are distinguishable and separately detectable by the scanning equipment. The scanning equipment detects the control signal in a control detection channel of the scanning equipment and detects the test signal preferably in a separate test detection channel of the scanner.

The control probe or stilt may be directly associated or indirectly associated with a control label. By directly associated, it is meant that the control probe or stilt comprises a control label directly attached (i.e., directly labeled) thereto. When the control label is attached or associated directly to the control probe or stilt at each feature location, the apparatus of the present invention advantageously is useful for non-destructive quality control evaluations of the array prior to a hybridization experiment, both before and after populating the microarray with oligomer test probes. With a directly labeled control probe or stilt, it is possible to scan and detect all features without ever having hybridized the array. Likewise, the oligomer test probe may be directly labeled with a test label.

By indirectly associated, it is meant that the control label is attached or associated with a complementary, control-specific target material. Likewise, the test label is attached or associated with a target sample under test. The features on the microarray become labeled (i.e., associated indirectly with a respective label) when the labeled control targets and labeled test targets are hybridized to the control probes or stilts and oligomer test probes, respectively, on the microarray apparatus. The labeled control targets hybridize with only the control probes or stilts and the labeled test targets hybridize with only the oligomer test probes. The labeled control targets are hybridized preferably in conjunction with (i.e., during the same hybridization step) the hybridization of the test target material to oligomer test probes. When the hybridized microarray is scanned, at least two different signals are emitted from each feature when the test target has hybridized to the oligomer test probes on a respective feature. The signals from the control label at each feature location are detected separately from each other and separately from the test labels at each feature location. When the control label is introduced to the control probe or stilt indirectly using a labeled control target in the same hybridization step with the labeled test target, advantageously, every feature on the microarray can be directly normalized for various signal trends (global or local) across the array.

In yet another way to label the control probe or stilt in accordance with the invention, the control probe is both directly labeled and indirectly labeled, as described above. Advantageously in this embodiment, both a pre-hybridization non-destructive quality control and feature location can be performed by scanning for the signals from the control probe label before or after populating the microarray with oligomer test probes and/or prior to hybridization, as well as a post-hybridization feature location and/or extraction with hybridization data normalization, as described above, using the signals from the control target label.

The apparatus of the present invention is used in hybridization experiments and is particularly useful for detecting all feature locations, regardless of the quality of the signal from hybridized test probes, regardless of the quality of the placement of the oligomer test probes, and regardless of the shape of the feature. The signals collected in the separate control channel are used to assist in feature location, especially for low or dim signal features.

In another aspect of the present invention, a microarray apparatus with enhanced feature detectability is provided. The microarray apparatus comprises an oligomer test probe attached in an array pattern of features on a substrate, as may be provided conventionally. According to this aspect of the invention, the apparatus further comprises a control sequence of nucleic acids attached at one end to a surface of the substrate at each feature location. The control sequence is associated with a control label that emits a control signal when excited by a light. When scanned with a microarray scanner, each feature will produce the control signal, thereby identifying the location of each feature, regardless of whether (and to what extent) the oligomer test probes hybridized with a target sample under test during a hybridization assay.

In another aspect of the present invention, a method of performing a non-destructive quality control evaluation on a microarray is provided. The method of performing comprises the steps of providing a labeled control probe to each feature of a plurality of features on a surface of a microarray substrate, wherein the labeled control probe emits a control signal when excited by a light; interrogating the populated microarray; and evaluating data acquired from the interrogation step. The interrogation step comprises scanning the microarray substrate with a light to excite each labeled control probe; and detecting the control signal from the labeled control probe on each feature. In one embodiment, the method of performing further comprises the step of providing an oligomer test probe to each feature. Each microarray substrate can be conveniently mapped for the precise location of each feature. Alternatively, the precise location of each feature on the microarray substrate can be conveniently confirmed or modified before subsequent depositions, such as the subsequent step of providing the oligomer test probes. This information could be made available to a user in a kit further described below.

In still another aspect of the present invention, a method of making a microarray with enhanced feature detectability is provided. The method comprises the step of providing a control probe at each feature location on a surface of a microarray substrate, wherein the control probe is associated with a control label that emits a control signal when exposed to light. The control probe is provided by attaching one end of the control probe to the surface of the microarray substrate. The method further comprises the step of providing an oligomer test probe at each feature location. Thus, each feature on the microarray comprises a control probe and an oligomer test probe. Further, before and/or after a hybridization assay, depending on the embodiment, each feature emits the characteristic control signal when exposed to light. The characteristic control signal is used to locate each feature, regardless of the quality or quantity of hybridization between oligomer test probes and a target sample under test.

In one embodiment of the method of making, the step of providing the oligomer test probe comprises adding the oligomer test probe to an opposite end of the control probe, such that the control probe extends between the surface of the substrate and the oligomer test probe. In this embodiment, the control probe is a control stilt. In another embodiment of the method, the step of providing the oligomer test probe comprises the step of adding the oligomer test probe to the substrate surface at each feature location. In a preferred embodiment of the method of making, the control probe is provided at each feature as a presynthesized whole oligonucleotide and the oligomer test probe is synthesized in situ at each feature location. More preferably, the oligomer test probe is synthesized in situ on the opposite end of the presynthesized control probe at each feature location.

In another aspect of the invention, a method of detecting hybridized features on a microarray with a microarray scanner is provided. The method comprises the steps of providing the microarray apparatus described above, and providing a control-specific target material that is complementary to the control probe. The control target material comprises a control target label that emits a control target signal when excited by a light from the scanner. The method further comprises the steps of providing the microarray apparatus and the labeled control target material to a user to perform a hybridization assay with a target sample under test, or to perform or have performed a hybridization assay for a user.

In yet another aspect of the present invention, a method of locating hybridized features on a microarray using a microarray scanner is provided. The microarray comprises an oligomer test probe located in an array pattern of features on a substrate, as may be provided conventionally. The oligomer test probes are for hybridizing with a target sample under test at one or more features. When hybridized, the hybridized oligomer test probes are labeled with a test label that emits a test signal when excited with a light. The method of locating hybridized features comprises the step of providing a control probe to a surface of the substrate at each feature location, such that each feature comprises the control probe and the oligomer test probe. The method further comprises associating a control label with the control probe. The control label emits a control signal when excited with the light. The control signal is different from the test signal. The method further comprises the step of interrogating the populated microarray with the microarray scanner to locate the hybridized oligomer test probes by detecting the control signals at each feature and separately detecting the test signals from the one or more features and correlating the detected signals.

In yet another aspect of the present invention, a kit is provided. The kit comprises the microarray apparatus of the present invention populated with control probes and oligomer test probes, as described above, and instructions on using the kit. In one embodiment of the kit, the control probes are directly labeled with a control probe label. In another embodiment, the control probes are not labeled directly. The kit further comprises a complementary, control-specific target material having a control target label to be used during hybridization experiments to better and more accurately locate experimental hybridization signals emitted at each feature. The complementary, control-specific target may be mixed with the experimental target sample under test to perform one hybridization step, or the control target may be hybridized to the control probes separately from the test target to the oligomer test probes at a user's discretion. Where the control probes are directly labeled, the kit may further comprise either quality control reference data to assist the user during feature extraction, or instructions on how to perform a non-destruct quality control evaluation on the microarray may be enclosed in the kit.

In still another aspect of the invention, a method of detecting features on a microarray is provided. The method comprises the step of providing the microarray apparatus of the present invention, having a control probe and an oligomer test probe in an array of features on a substrate. The control probe is associated with a control label that emits a control signal when excited by light. The method of detecting further comprises the steps of interrogating the microarray with the microarray scanner to detect the control signal associated with the control probe; and evaluating data collected on the detected control signals. The control probe is associated with the control label either directly or indirectly, or both. The oligomer test probe is associated with a test label either directly or indirectly, or both. The test label emits a test signal when excited by light. The test signal is different and separately detectable from the control signal. When both the control probe and the oligomer test probe are associated with a respective label, the step of interrogating comprises the steps of scanning the features on the microarray with a light to excite the labels; detecting the control signal from each feature; and separately detecting the test signals. Moreover, the step of evaluating further comprises evaluating the data collected on the detected test signals. In one embodiment, the method further comprises the step of exposing the microarray to a hybridization solution comprising a target sample under test. Where the control label comprises a control probe label associated directly on the control probes and a separate control target label indirectly associated with the control probe by hybridization, the hybridization solution further comprises the labeled control target material. During the step of interrogating, each feature location can be identified prior to hybridization by detecting the control probe signal for quality control purposes or reference data, and after hybridization, the hybridized oligomer test probes can be located by detecting the test signals from the hybridized test probes and the control target signals from the hybridized control probes. The data collected from the detected control target signals aid in normalizing the hybridization data for the test target samples. The test signal and preferably, each of the control signal(s) are separately detected in separate channels of the detection system of the microarray scanner.

The present invention provides many advantages, such as being able to precisely locate every feature regardless of the quality or quantity of the test target signals. Thus, feature extraction can potentially find features much more precisely and accurately than by simple grid fitting and interpolating low signal feature locations.

BRIEF DESCRIPTION OF THE DRAWINGS

The various features and advantages of the present invention may be more readily understood with reference to the following detailed description taken in conjunction with the accompanying drawings, where like reference numerals designate like structural elements, and in which.

MODES FOR CARRYING OUT THE INVENTION

Definitions

Figure 1:
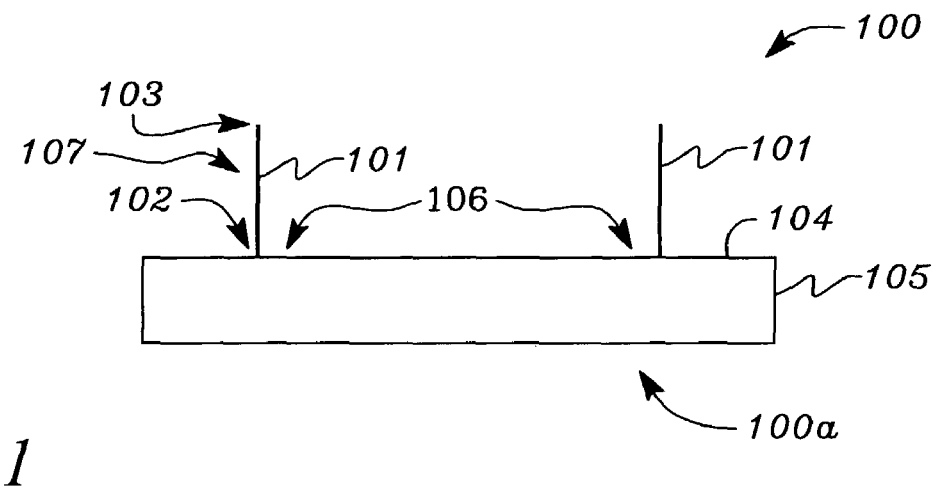
FIG. 1 illustrates a partial side view of the apparatus of the present invention.

The following terms are intended to have the following general meanings as they are used herein:

Polynucleotide—a compound or composition that is a polymeric nucleotide or nucleic acid polymer. The polynucleotide may be a natural compound or a synthetic compound. In the context of an assay, the polynucleotide can have from about 5 to 5,000,000 or more nucleotides. The larger polynucleotides are generally found in the natural state. In an isolated state the polynucleotide can have about 30 to 50,000 or more nucleotides, usually about 100 to 20,000 nucleotides, more frequently 500 to 10,000 nucleotides. It is thus obvious that isolation of a polynucleotide from the natural state often results in fragmentation. The polynucleotides include nucleic acids, and fragments thereof, from any source in purified or unpurified form including DNA, double-stranded or single stranded (dsDNA and ssDNA), and RNA, including t-RNA, m-RNA, r-RNA, mitochondrial DNA and RNA, chloroplast DNA and RNA, DNA/RNA hybrids, or mixtures thereof, genes, chromosomes, plasmids, the genomes of biological materials such as microorganisms, e.g. bacteria, yeasts, viruses, viroids, molds, fungi, plants, animals, humans, and the like. The polynucleotide can be only a minor fraction of a complex mixture such as a biological sample. Also included are genes, such as hemoglobin gene for sickle-cell anemia, cystic fibrosis gene, oncogenes, cDNA, and the like.

Polynucleotides include analogs of naturally occurring polynucleotides in which one or more nucleotides are modified over naturally occurring nucleotides. Polynucleotides then, include compounds produced synthetically (for example, PNA as described in U.S. Pat. No. 5,948,902 and the references cited therein, all of which are incorporated herein by reference), which can hybridize in a sequence specific manner analogous to that of two naturally occurring polynucleotides.

The polynucleotide can be obtained from various biological materials by procedures well known in the art. The polynucleotide, where appropriate, may be cleaved to obtain a fragment that contains a target nucleotide sequence, for example, by shearing or by treatment with a restriction endonuclease or other site specific chemical cleavage method, such as limited RNase digestion, to produce smaller RNA fragments.

For purposes of this invention, the polynucleotide, or a cleaved fragment obtained from the polynucleotide, will usually be at least partially denatured or single stranded or treated to render it denatured or single stranded. Such treatments are well known in the art and include, for instance, heat or alkali treatment, or enzymatic digestion of one strand. For example, double stranded DNA (dsDNA) can be heated at 90-100° C. for a period of about 1 to 10 minutes to produce denatured material, while RNA produced via transcription from a dsDNA template is already single stranded.

Oligonucleotide—a polynucleotide, usually single stranded, usually a synthetic polynucleotide but may be a naturally occurring polynucleotide. The oligonucleotide(s) are usually comprised of a sequence of at least 5 nucleotides, usually, 10 to 100 nucleotides, more usually, 20 to 50 nucleotides, preferably, 10 to 30 nucleotides, more preferably, 20 to 30 nucleotides, and desirably about 25 nucleotides in length.

Various techniques can be employed for preparing an oligonucleotide. Such oligonucleotides can be obtained by biological synthesis or by chemical synthesis. For short sequences (up to about 100 nucleotides), chemical synthesis will frequently be more economical as compared to the biological synthesis. In addition to economy, chemical synthesis provides a convenient way of incorporating low molecular weight compounds and/or modified bases during specific synthesis steps. Furthermore, chemical synthesis is very flexible in the choice of length and region of target polynucleotides binding sequence. The oligonucleotide can be synthesized by standard methods such as those used in commercial automated nucleic acid synthesizers. Chemical synthesis of DNA on a suitably modified glass or resin can result in DNA covalently attached to the surface. This may offer advantages in washing and sample handling. For longer sequences standard replication methods employed in molecular biology can be used such as the use of M13 for single stranded DNA as described in J. Messing (1983) *Methods Enzymol.* 101:20-78.

In situ synthesis of oligonucleotide or polynucleotide probes on the substrate is performed in accordance with well-known chemical processes, including, but not limited to sequential addition of nucleotide phosphoramidites to surface-linked hydroxyl groups, as described by T. Brown and Dorcas J. S. Brown in *Oligonucleotides and Analogues A Practical Approach*, F. Eckstein, editor, Oxford University Press, Oxford, pp. 1-24 (1991), and incorporated herein by reference. Indirect synthesis may be performed in accordance biosynthetic techniques (e.g. polymerase chain reaction "PCR"), as described in Sambrook, J. et al., "Molecular Cloning, A Laboratory Manual", $2^{nd}$ edition 1989, incorporated herein by this reference.

Other methods of oligonucleotide synthesis include, but are not limited to solid-phase oligonucleotide synthesis according to the phosphotriester and phosphodiester methods (Narang, et al., (1979) *Meth. Enzymol.* 68:90), and to the H-phosphonate method (Garegg, P. J., et al., (1985) "Formation of internucleotidic bonds via phosphonate intermediates", *Chem. Scripta* 25, 280-282; and Froehler, B. C., et al., (1986a) "Synthesis of DNA via deoxynucleoside H-phosphonate intermediates", *Nucleic Acid Res.,* 14, 5399-5407, among others) and synthesis on a support (Beaucage, et al. (1981) *Tetrahedron Letters* 22:1859-1862) as well as phosphoramidite techniques (Caruthers, M. H., et al., "Methods in Enzymology," Vol. 154, pp. 287-314 (1988) and others described in "Synthesis and Applications of DNA and RNA," S. A. Narang, editor, Academic Press, New York, 1987, and the references contained therein, and nonphosphoramidite techniques. The chemical synthesis via a photolithographic method of spatially addressable arrays of oligonucleotides bound to glass surfaces is described by A. C. Pease, et al., Proc. Nat. Aca. Sci. USA (1994) 91:5022-5026. Oligoribonucleotide synthesis using phage RNA polymerase and ribonucleoside triphosphates is described by Milligan, J. F., et al., (1987) "Oligoribonucleotide synthesis using T7 RNA polymerase and synthetic DNA templates", *Nucl. Acids Res.* 15, 8783-8798; and using protected ribonucleoside phosphoramidites and chemical synthesis is described by Wu T., et al., (1989) "Prevention of chain cleavage in the chemical synthesis of 2'-O-silylated oligoribonucleotides", *Nucl. Acids Res.* 17, 3501-3517, among others.

For the purposes of the invention, the term "oligonucleotide" includes the term "polynucleotide", unless stated otherwise.

Oligomer test probe—an oligonucleotide employed to bind to a target sample under test. The design and preparation of the oligonucleotide test probes are generally dependent upon the sensitivity and specificity required, the sequence of the test target and, in certain cases, the biological significance of certain portions of the target polynucleotide sequence. Typically the oligomer test probes used in an experiment differ from one another to address different test target sequences or different parts of a test target sequence.

Test target or target sample under test—a sample comprising a sequence of nucleotides, usually existing within a portion or all of a polynucleotide test sample, usually a polynucleotide analyte to be characterized. The identity of the target nucleotide sequence generally is known to an extent sufficient to allow preparation of various oligomer test probe sequences hybridizable with the test target nucleotide sequence. The test target has one or more unknown characteristics to be determined by experiment using oligomer test probes.

The test target sequence usually contains from about 30 to 5,000 or more nucleotides, preferably 50 to 1,000 nucleotides. The test target nucleotide sequence is generally a fraction of a larger molecule or it may be substantially the entire molecule such as a polynucleotide as described above. The minimum number of nucleotides in the test target nucleotide sequence is selected to assure that the presence of a target polynucleotide in a sample is a specific indicator of the presence of polynucleotide in a sample. The maximum number of nucleotides in the test target nucleotide sequence is normally governed by several factors: the length of the polynucleotide from which it is derived, the tendency of such polynucleotide to be broken by shearing or other processes during isolation, the efficiency of any procedures required to prepare the sample for analysis (e.g. transcription of a DNA template into RNA) and the efficiency of detection and/or amplification of the target nucleotide sequence, where appropriate.

Control probe or control sequence—an oligonucleotide or oligomer having a known sequence of nucleotides in a known quantity, which is statistically known not to hybridize or otherwise interfere with an oligomer test probe or target sample under test. A control stilt is a control probe linked at one end to an oligomer test probe while an opposite end is attached or immobilized on a surface of an array substrate. The control probe or stilt is a standard or reference used to compare with experimental results. The control probe or stilt is not, and does not function as, an oligomer test probe, and therefore, does not hybridized with (and does not interfere with the hybridization of) a test target sample.

Control-specific target or control target—an oligonucleotide having a known sequence of nucleotides in a known quantity, which is particularly or specifically complementary to a control probe or stilt. The control target is statistically known not to hybridize or otherwise interfere with an oligomer test probe or a target sample under test. The control target is a standard or reference used in experiments that include the control probe or stilt. The characteristics of the control target are known and therefore, the control target is not, and does not function as, a test target sample and does not hybridize with (and does not interfere with the hybridization of) oligomer test probes.

Monomer—A member of the set of small molecules that can be joined together to form a polymer. As used herein, monomer refers to any member of a basis set for synthesis of a polymer. The monomer may be natural or synthetic. Different monomers may be used at successive steps in the synthesis of a polymer. Furthermore, a monomer may include protected members that are modified after synthesis. A modified monomer is a naturally occurring monomer, obtained from a natural source or produced synthetically, that is chemically modified to add, replace, substitute, delete, or otherwise change one or more groups or bonds contained in the monomer.

Nucleotide—the monomeric unit of nucleic acid polymers, i.e., DNA and RNA, whether obtained from a natural source or produced synthetically, which comprises a nitrogenous heterocyclic base, which is a derivative of either a purine or pyrimidine, a pentose sugar, and a phosphate (or phosphoric acid). When the phosphate is removed, the monomeric unit that remains is a "nucleoside". Thus a nucleotide is a 5'-phosphate of the corresponding nucleoside. When the nitrogenous base is removed from the nucleotide, the monomeric unit that remains is a "phosphodiester". For the purposes of the invention, "nucleotide" includes its corresponding nucleoside and phosphodiester, and "oligonucleotide" includes its corresponding oligonucleoside and oligophosphodiester, unless indicated otherwise.

Modified nucleotide—a modified monomer in a nucleic acid polymer that contains a modified base, sugar and/or phosphate group. The modified nucleotide can be naturally occurring or produced by a chemical modification of a nucleotide either as part of the nucleic acid polymer or prior to the incorporation of the modified nucleotide into the nucleic acid polymer. For example, the methods mentioned above for the synthesis of an oligonucleotide may be employed. In another approach a modified nucleotide can be produced by incorporating a modified nucleoside triphosphate into the polymer chain during an amplification reaction. Examples of modified nucleotides, by way of illustration and not limitation, include dideoxynucleotides, derivatives or analogs that are biotinylated, amine modified, alkylated, fluorophore-labeled, and the like and also include phosphorothioate, phosphite, ring atom modified derivatives, and so forth.

Hybridization (hybridizing) or binding—In the context of nucleotide sequences these terms are used interchangeably herein to mean to associate together. The ability of two nucleotide sequences to hybridize with each other is based on the degree of complementarity of the two nucleotide sequences, which in turn is based on the fraction of matched complementary nucleotide pairs. The more nucleotides in a given sequence that are complementary to another sequence, the more stringent the conditions can be for hybridization and the more specific will be the binding of the two sequences. Increased stringency is achieved by elevating the temperature, increasing the ratio of co-solvents, lowering the salt concentration, and the like. Hybridization solutions and processes for hybridization are described in J. Sambrook, E. F. Fritsch, T. Maniatis, *Molecular Cloning: A Laboratory Manual*, Cold Spring Harbor Laboratory Press, Cold Spring Harbor, Ed. $2^{nd}$, 1989, vol. 1-3, incorporated herein by reference. Conditions for hybridization typically include (1) high ionic strength solution, (2) at a controlled temperature, and (3) in the presence of carrier DNA and detergents and divalent cation chelators, all of which are well known in the art.

Complementary—A term directed to the affinity that one biological material has for binding to another biological material, such as members of a specific binding pair, as defined below. With respect to nucleotide complements, two sequences are complementary when the sequence of one can bind to the sequence of the other in an anti-parallel sense wherein the 3'-end of each sequence binds to the 5'-end of the other sequence and each A, T(U), G, and C of one sequence is then aligned with a T(U), A, C, and G, respectively, of the other sequence. Non-standard base pairing is also possible with nucleotide complements, for instance, the sequences may be parallel to each other and non-Watson-Crick base pairing may occur. Examples of the latter are complementary G=U or U=G base pairs in RNA sequences or complementary G=T or T=G base pairs in DNA sequences.

Substrate or surface—a porous or non-porous water insoluble material. The surface can have any one of a number of shapes, such as strip, plate, disk, rod, particle, including bead, and the like. The substrate can be hydrophobic or hydrophilic or capable of being rendered hydrophobic or hydrophilic and includes inorganic powders such as silica, magnesium sulfate, and alumina; natural polymeric materials, particularly cellulosic materials and materials derived from cellulose, such as fiber containing papers, e.g., filter paper, chromatographic paper, etc.; synthetic or modified naturally occurring polymers, such as nitrocellulose, cellulose acetate, poly (vinyl chloride), polyacrylamide, cross linked dextran, agarose, polyacrylate, polyethylene, polypropylene, poly(4-methylbutene), polystyrene, polymethacrylate, poly(ethylene terephthalate), nylon, poly(vinyl butyrate), etc.; either used by themselves or in conjunction with other materials; glass available as Bioglass, ceramics, metals, and the like. Natural or synthetic assemblies such as liposomes, phospholipid vesicles, and cells can also be employed. Common substrates used for arrays are surface-derivatized glass or silica, or polymer membrane surfaces, as described in Z. Guo et al. (cited above) and U. Maskos, E. M. Southern, *Nucleic Acids Res* 20, 1679-84 (1992) and E. M. Southern et al., *Nucleic Acids Res* 22, 1368-73 (1994), both incorporated herein by reference.

Immobilization of oligonucleotides on a substrate or surface may be accomplished by well-known techniques, commonly available in the literature. See, for example, A. C. Pease, et al., *Proc. Nat. Acad. Sci. USA*, 91:5022-5026 (1994); Z. Guo, R. A. Guilfoyle, A. J. Thiel, R. Wang, L. M. Smith, *Nucleic Acids Res* 22, 5456-65 (1994); and M. Schena, D. Shalon, R. W. Davis, P. O. Brown, *Science,* 270, 467-70 (1995), each incorporated herein by reference. Linkers are known from the references cited above. For the purposes of the invention, a substrate surface includes a surface comprising linkers or other means for immobilization or attachment of oligonucleotides, and an oligonucleotide attached, added or provided at, to or on a surface includes attached, added or provided to a linker on the surface. Also for the purposes of the invention, a linker is not a control probe or a control target.

Label—A member of a signal producing system. Usually the label is part of a target nucleotide sequence or an oligonucleotide probe, either being conjugated thereto or otherwise bound thereto or associated therewith. The label is capable of being detected directly or indirectly. Labels include (i) reporter molecules that can be detected directly by virtue of generating a signal, (ii) specific binding pair members that may be detected indirectly by subsequent binding to a cognate that contains a reporter molecule, (iii) oligonucleotide primers that can provide a template for amplification or ligation or (iv) a specific polynucleotide sequence or recognition sequence that can act as a ligand such as for a repressor protein, wherein in the latter two instances the oligonucleotide primer or repressor protein will have, or be capable of having, a reporter molecule. In general, any reporter molecule that is detectable can be used. For example, the nucleic acid base is modified to include biotin, which binds to streptavidin that has been previously covalently linked to a fluorophore. Direct labels are commercially available from several manufacturers, including Boehringer-Mannheim and Amersham-Pharmacia Biotech. Boehringer-Mannheim also sells biotinylated nucleotides, and Amersham-Pharmacia Biotech also sells streptavidin labeled with a variety of fluorophores.

The reporter molecule can be isotopic or nonisotopic, usually nonisotopic, and can be a catalyst, such as an enzyme, a polynucleotide coding for a catalyst, promoter, dye, fluorescent molecule, chemiluminescer, coenzyme, enzyme substrate, radioactive group, a small organic molecule, amplifiable polynucleotide sequence, a particle such as latex or carbon particle, metal sol, crystallite, liposome, cell, etc., which may or may not be further labeled with a dye, catalyst or other detectable group, and the like. The reporter molecule can be a fluorescent group such as fluorescein, a chemiluminescent group such as luminol, a terbium chelator such as N-(hydroxyethyl)ethylenediaminetriacetic acid that is capable of detection by delayed fluorescence, and the like.

The label can generate a detectable signal either alone or together with other members of the signal producing system. As mentioned above, a reporter molecule can be bound directly to a nucleotide sequence or can become bound thereto by being bound to a specific binding pair (sbp) member complementary to an sbp member that is bound to a nucleotide sequence. Examples of particular labels or reporter molecules and their detection can be found in U.S. Pat. No. 5,508,178, the relevant disclosure of which is incorporated herein by reference. When a reporter molecule is not conjugated to a nucleotide sequence, the reporter molecule may be bound to an sbp member complementary to an sbp member that is bound to or part of a nucleotide sequence.

Control label—a label, as defined herein, associated with a control probe and/or a control target. When associated with both a control probe and a control target, the control label comprises two labels, a "control probe label" associated with the control probe and a separate "control target label" associated with the control target. The control label emits a signal when excited by light, referred to as a "control signal". The control probe label and the control target label each emit a different control signal, referred to as the "control probe signal" and the "control target signal". The control label is a standard or reference label, which is used in experiments that include the control probe. The control label(s) and the control signal(s) emitted therefrom are distinguishable from a test label and its signal.

Test label—a label, as defined herein, associated with a test probe and/or a test target. When associated with both a test probe and a test target, the test label comprises two labels, a "test probe label" associated with the test probe and a separate "test target label" associated with the test target. The test label emits a signal when excited by light, referred to as a "test signal". The test probe label and the test target label each emit a different test signal, referred to as the "test probe signal" and the "test target signal". The test label(s) and the test signal(s) emitted therefrom are distinguishable from the control label and its signal. The test label is used in hybridization assays to locate and characterize the test probe and/or the test target sample.

Signal Producing System—The signal producing system may have one or more components, at least one component being the label. The signal producing system generates a signal that typically relates to the presence or amount of a target polynucleotide in a medium. A signal producing system may be incorporated on the oligonucleotide probes and relates to the presence of probes in a medium. The signal producing system includes all of the reagents required to produce a measurable signal. Other components of the signal producing system may be included in the developer solution and can include substrates, enhancers, activators, chemiluminescent compounds, cofactors, inhibitors, scavengers, metal ions, specific binding substances required for binding of signal generating substances, and the like. Other components of the signal producing system may be coenzymes, substances that react with enzymic products, other enzymes and catalysts, and the like. The signal producing system provides a signal detectable by external means, by use of electromagnetic radiation, desirably by optical examination. Signal-producing systems that may be employed in the present invention are those described more fully in U.S. Pat. No. 5,508,178, the relevant disclosure of which is incorporated herein by reference.

Member of a specific binding pair ("sbp member")—One of two different molecules, having an area on the surface or in a cavity that specifically binds to and is thereby defined as complementary with a particular spatial and polar organization of the other molecule. The members of the specific binding pair are referred to as cognates or as ligand and receptor (anti-ligand). These may be members of an immunological pair such as antigen-antibody, or may be operator-repressor, nuclease-nucleotide, biotin-avidin, hormones-hormone receptors, nucleic acid duplexes, IgG-protein A, DNA-DNA, DNA-RNA, and the like.

Small organic molecule—a compound of molecular weight less than 1500, preferably 100 to 1000, more preferably 300 to 600 such as biotin, fluorescein, rhodamine and other dyes, tetracycline and other protein binding molecules, and haptens, etc. The small organic molecule can provide a means for attachment of a nucleotide sequence to a label or to a support.

DETAILED DESCRIPTION OF THE INVENTION

The present apparatus and methods provide novel techniques for detecting essentially all of the feature locations on a microarray without having to rely on the quality or quantity of hybridization between oligomer test probes and a target sample under test. The present invention is related to a co-pending application Ser. No. 09/292,289, filed Apr. 15, 1999 by Paul Wolber, entitled "APPARATUS, SYSTEMS AND METHOD FOR LOCATING NUCLEIC ACIDS BOUND TO SURFACES", which is assigned to the present assignee and is incorporated herein by reference in its entirety.

Figure 2:
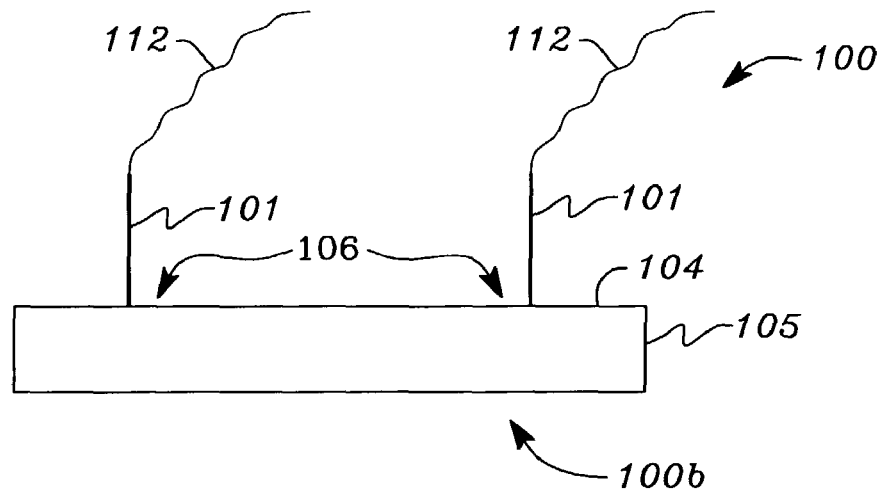
FIG. 2 illustrates a partial side view of one embodiment of the apparatus of FIG. 1.
Figure 3:
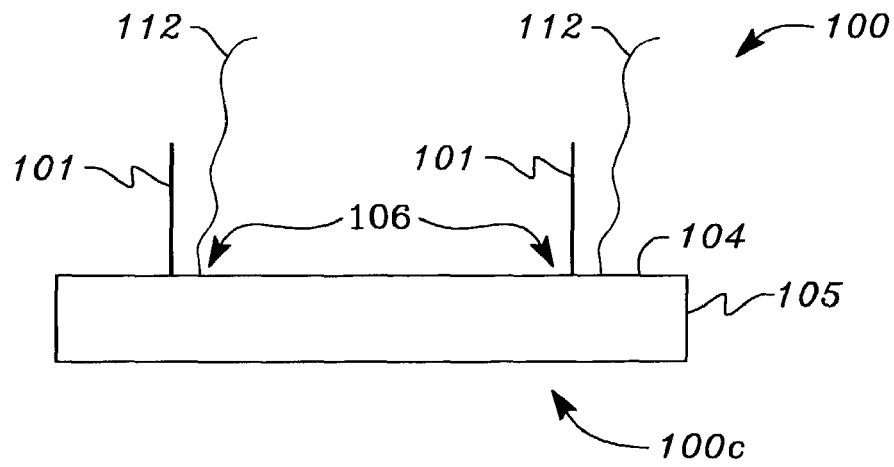
FIG. 3 illustrates a partial side view of another embodiment of the apparatus of FIG. 1.

FIGS. 1-3 illustrate an apparatus 100 of the present invention. The apparatus 100 comprises a control probe 101 attached at one end 102 to a surface 104 of a microarray substrate 105 in an array pattern of features 106. The control probe 101 comprises a known sequence of nucleic acids, which can be more complex (or diverse) than a poly-T or poly-A sequence. The control probe 101 is capable of hybridizing with only a control-specific target material of known nucleic acid sequence, as defined above. Preferably, the control probe is a positive control probe in that it provides bright features (i.e., strong signals) when scanned, such as those listed in Table 1.

Table 1 lists only two possible control probe sequences that will work for the invention. The list is illustrative only and is not intended to limit the scope of the present invention. In fact, any control probe sequence will work for the invention provided that the control probe 101 does not have a sequence that is similar to the sequence of the oligomer test probe, such that a target sample under test might hybridize with the control probe 101 instead of with its intended complementary oligomer test probe. For the present invention, the control probe 101 may be selected from a completely different species (plant vs. animal, etc.), for example, to essentially eliminate or minimize any interaction between the control probes and the target sample under test. Alternatively, the control probe 101 is selected to be specific to a control target that has been selected to not interact with the oligomer test probe and/or the test target sample. Techniques for identifying control probe sequences for the present invention are well known in the art.

TABLE 1

Examples of Control Probe Sequences

| Name | Sequence |
| --- | --- |
| Pro25G | atcatcgtagctggtcagtgtatcc (SEQ ID NO: 1) |
| HCV48-24 | acagggagtgatctatggtggagt (SEQ ID NO: 2) |

The control probe 101 is associated with a control label 107 that emits a control signal 108 (not shown) upon excitation with light. The signal 108 emitted from the control label 107 is unique to the control probe. By unique, it is meant that the signal 108 is distinguishable from any other signals emitted from the microarray during an optical scan. As a result, the precise location of each and every feature 106 in the microarray is separately detectable based on the signal 108 emitted by the associated control label 107. The control signal 108 from the associated control label 107 is advantageously separately detectable by a microarray scanner (not shown), preferably in a separate detection channel of the microarray scanner, so not to interfere with other signals and their detection by the scanning equipment.

The labels used in accordance with the invention can be any label or labeling system that is known in the art, as defined above. Moreover, any labeling technique known in the art may be used for the invention. What is important to the invention is that the labels used for the various controls emit signals that are different from one another and that are different from the labels and the respective signals associated with the test probes and test target samples, defined above and described further below. Further, it is important that each label emits a signal that is in a spectral range detectable by a detection channel of the scanning equipment (i.e., detection channel and signal color-matching). Examples of commonly used labels that will work for the present invention include, but are not limited to, CY3 and CY5 cyanine dyes obtained from Amersham-Pharmacia Biotech.

In one embodiment 100a of the apparatus 100 illustrated in FIG. 1, the control probe 101 comprises the control label 107 (illustrated generally by the arrowhead 107 in FIG. 1) attached or associated directly therewith. The embodiment 100a is useful for performing non-destructive quality control evaluations of the microarray prior to performing a hybridization experiment, before and/or after the microarray is populated with oligomer test probes 112, described further below. FIG. 1 illustrates one example of the apparatus 100 before the oligomer test probes are populated on the substrate 105. As mentioned above, the non-destructive quality control evaluation can be performed after the oligomer test probes are added also, as long as the control probe 101 is directly labeled. With this embodiment 100a, all features 106 on the microarray can be detected when scanned by detecting the control signal 108 from the control label 107 to ensure the quality of the microarray. A non-destructive quality control evaluation is particularly useful when the microarray apparatus 100 will be used to hybridize extremely valuable target samples under test, or test target samples in very small quantities. A microarray that is verified prior to hybridization will less likely waste the precious test target sample. Further, this embodiment 100a provides for precise feature location during feature extraction after hybridization of the oligomer test probes, as further described below. Moreover, this embodiment 100a does not necessitate hybridizing complementary control target to the control probe, as described further below, and consequently, this embodiment would not provide information necessary to normalize data related to the hybridization.

The apparatus 100 further comprises an oligomer test probe 112 located at each feature location 106 of the microarray substrate 105 along with the control probe 101. FIG. 2 illustrates one embodiment 100b of the apparatus 100, after the oligomer test probes 112 are attached. In the embodiment 100b of FIG. 2, the control probe 101 functions as a control stilt 101. The oligomer test probe 112 is attached at an opposite end 103 of the control stilt 101, such that the control stilt 101 is an extension between the surface 104 of the array substrate 105 and the oligomer test probe 112. Advantageously, the apparatus 100b provides a 1:1 correspondence between the quantity of control stilt 101 and the quantity of oligomer test probe 112. The control stilt 101 essentially extends the oligomer test probe 112 away from the surface 104, which advantageously may also enhance signal intensity of short oligomer test probes, such as oligomers having around 25 monomers in length.

FIG. 3 illustrates another embodiment 100c of apparatus 100 after the microarray is populated with the oligomer test probes 112, wherein the oligomer test probe 112 is added directly to the surface 104 of the substrate 105 within each feature location 106 along with the control probe 101. In this embodiment 100c, the opposite end 103 of the control probe 101 is capped to prevent the oligomer test probe 112 from attaching thereto. Thus, each feature 106 comprises the control probe 101 and the oligomer test probes 112, each separately attached to the surface 104 at each feature location 106. Accordingly, there is no 1:1 correlation between the quantity of control probes 101 and the oligomer test probes 112 in the embodiment 100c.

In both embodiments 100b and 100c, the apparatus 100 may or may not be evaluated for non-destructive quality control purposes in accordance with the invention. Where quality control evaluations are desired, the embodiments 100b and 100c comprise the embodiment 100a of the apparatus 100 illustrated in FIG. 1, wherein the control probe or stilt 101 is directly labeled with a control label 107. Moreover, it should be noted that the oligomer test probe 112 may be directly labeled with a test label 114, which produces a test signal 115 when exposed to light that is different from the control signal 108. The directly labeled oligomer test probe 112 may be detected at each feature 106 also, during the quality control scan of the populated microarray 100, in accordance with the present invention.

For embodiments 100b, 100c according to the invention, every feature location 106 comprises the oligomer test probe 112 and the control probe or stilt 101. In practice, there is a plurality of features 106, each feature 106 on the microarray 105 typically has a plurality of the same control probes or stilts 101 and a plurality of the same oligomer test probes 112 populated thereon. The nucleic acid sequence of the control probe or stilt 101 advantageously may be the same on each feature 106, or at least one feature may have a different control probe sequence populated thereon. The oligomer test probes 112 may be the same or different from feature 106 to feature 106, depending on the hybridization experiment to be performed. FIGS. 1-3 illustrate only one control probe or stilt 101 and only one oligomer test probe 112 on each feature 106 and only two features 106, for simplicity sake only.

According to the invention, the control probes or stilts 101 and the oligomer test probes 112 may be applied to the array by any well-known technique. For example, the control probes or stilts 101 may be presynthesized in a conventional DNA synthesizer and deposited as whole oligonucleotides or cDNA onto the substrate 105 by spotting or by inkjet deposition techniques that are known in the art. Moreover, the oligomer test probes 112 may be likewise presynthesized and deposited as whole oligonucleotides or cDNA. Alternatively, the control probes or stilts 101 and/or the oligomer test probes 112 may be synthesized in situ on the substrate using well-known techniques of in situ synthesis. In a preferred embodiment, the control probes or stilts 101 are presynthesized and deposited onto the substrate 105 in the array of features 106 and the oligomer test probes 112 are synthesized in situ directly to the free end 103 of the control stilt 101. In the embodiment 100c of FIG. 3, the control probes 101 may be capped at the free end 103 to prevent attachment of the oligomer test probes 112 thereto, especially when the oligomer test probes 112 are provided by in situ synthesis.

As an alternative to the direct labeling of the control probe or stilt 101, as in embodiment 100a of the apparatus 100, in the embodiments 100b, 100c, the control label 107 can be indirectly associated with the control probe or stilt 101 by hybridization, in that the control label 107 is attached or associated directly with a complementary or control-specific target material 109 that is exposed to the microarray apparatus 100 for hybridization. Similarly, the test label 114 may be indirectly associated with the oligomer test probe 112 by hybridization in that the test label 114 is preferably attached or associated directly with a target sample under test 113. After the control probes or stilt 101 and the oligomer test probe 112 are added to the substrate 105, the apparatus 100 comprising control probes or stilts 101 and oligomer test probes 112 is exposed to a hybridization solution, typically by a user of the microarray apparatus 100 whom has a target sample 113 to be tested. The hybridization solution comprises the labeled experimental test target sample 113 and preferably, the labeled control-specific target material 109. The hybridization assay is performed, preferably in one hybridization step. Alternatively, the labeled control-specific target 109 can be hybridized to the control probe or stilt 101 separately from the hybridization of the labeled test target material 113, either by the user or the manufacturer of the apparatus 100, for example. Thus, the control probe or stilt 101 and the oligomer test probe 112 are indirectly associated with the respective control and test labels 107, 114 by hybridization.

The hybridized control probe or stilt 110 emits the control signal 108 that is separately detectable in (i.e., matched with) a detection channel of the scanning equipment, preferably different from the channel used to detect the test signal 115 from hybridized oligomer test probe 120. The control signal 108 data obtained from the separate channel can be used with hybridization test signal 115 data to locate all features 106, regardless of the quality or quantity of the hybridization test signals 115. This is particularly useful where the quantity of test target sample 113 is so small that the test signals 115 from the hybridized test probes 120 are very weak or dim, and therefore not easily detectable by conventional methods.

In another alternative way of associating a control label 107 to the control probe or stilt 101 in embodiments 100b, 100c, the control probe or stilt 101 is both directly labeled and indirectly labeled, both as described above. In this alternative labeling scheme, the control label 107 comprises a control probe label 107a and a control target label 107b and the control signal 108 comprises a control probe signal 108a and a control target signal 108b, respectively. The control probe label 107a is attached or associated directly with the control probe or stilt 101, as in the embodiment 100a, and the separate control target label 107b is indirectly associated with the control probe or stilt 101 upon hybridization by attaching the control target label 107b to the control-specific target 109. After the oligomer test probes 112 are added to the features 106 of the microarray substrate 105, the microarray apparatus 100 is exposed to a hybridization solution, as described above. The hybridized control probe 110 emits two distinguishable and separately detectable control signals 108a, 108b when optically scanned. Likewise, in one embodiment, the test label 114 may comprise a test probe label 114a labeled directly on the oligomer test probe 112 and a test target label 114b labeled on the test target sample 113. After hybridization, the hybridized oligomer test probe 120 emits two distinguishable and separately detectable test signals 115a, 115b, which are also distinguishable and separately detectable from control signals 108a, 108b, when optically scanned.

The control probe signal 108a emitted from the control probe label 107a may be detected in one channel and the control target signal 108b from the control target label 107b may be detected in preferably another separate channel of the scanner, both channels of which are preferably different or separate from the channels used to detect the test signals 115 from the hybridized test probe 120, so as to be fully distinguishable therefrom. Where the control labels 107a, 107b each emit a control signal 108a, 108b, a microarray scanner comprising a requisite number of separate detection channels is preferred. Four-channel microarray scanners are known in the art and would work for the dual control signals 108a, 108b embodiment of the invention. In fact, a four-channel scanning system would accommodate the dual control signals 108a, 108b and the dual test signals 115a, 115b, as may be provided in one embodiment of the present invention described above. Advantageously, where both the control probe or stilt 101 and the control target 109 are labeled, both a pre-hybridization non-destructive quality control evaluation and feature location are possible by detecting the control probe signal 108a from the control probe label 107a, as in embodiment 100a, with a microarray scanner, as well as a post-hybridization feature location and/or extraction with normalization of hybridization data, by detecting at least the control target signal 108b from the control target label 107b and separately detecting the test signals 115.

However, it should be noted that a pre-hybridization scan for a non-destructive quality control evaluation and a post-hybridization scan for obtaining hybridization assay results would be performed at different times and possibly with different microarray scanners. A pre-hybridization scan will detect only the control signal 108 or the control probe signal 108a from the directly labeled control probe or stilt 101. Likewise, the pre-hybridization scan also may detect only the test signal 115 or the test probe signal 115a from the directly labeled oligomer test probe 112 in one embodiment. On the other hand, the post hybridization scan will detect the control signal 108 or the control target signal 108b from the indirectly labeled, hybridized control probe or stilt 110, and also could be used to detect the control probe signal 108a. Likewise, the post-hybridization scan also will detect the test signal 115 or the test target signal 115b from the indirectly labeled, hybridized oligomer test probe 120, and also could be used to detect the test probe signal 115a (if present).

The microarray scanner used to scan the microarray apparatus 100 of the present invention for pre- or post-hybridization scans need not have a separate detection channel to detect each of the various control and test signals. However, the microarray scanner should be able to detect each of the different signals separately. The microarray scanner useful for the invention has two or more separate detection channels, and preferably at least four separate channels. A two-channel microarray scanning system can be used to detect the various control signals 108 and test signals 115 separately in separate scans in each channel, provided that any adverse effects, such as "bleaching" the labels 107, 114 can be accounted for and the two detection channels are alternated or the wavelength range detected by each channel is changeable (e.g., with filters), such that each channel detects a different range of wavelengths for each scan. One skilled in the art would readily understand how to use a two-channel microarray scanner for separately detecting three to four separate (i.e., different wavelength range) signals 108a, 108b, 115a, 115b, and the scope of the invention is not to be limited by the microarray scanning system used.

An example of the use of the microarray apparatus 100 of the present invention is in a well-known standard red/green experiment (i.e., two-color experiment). A hybridization mixture would be made comprising a test target reference sample 113 and a test target experimental 113' sample. Generally, two fluorescent dyes, such as CY3 and CY5 (well-known dyes mentioned above), are used for the test labels 114, 114' on the reference and experimental test target samples 113, 113', which produce red and green signals 115, 115', respectively. The two-color experiments are used where the reference test target sample 113 might be an untreated cell line and the experimental test target sample 113' might be a drug-treated cell line, for example. A user would be interested in the difference in gene expression between these two samples 113, 113'. The standard red/green experiments may be performed in pairs; the dyes 114, 114' are swapped between the test sample 113, and the test reference 113' in the pairs (i.e., dye swap experiments) and the results are compared.

When the typical red/green experiment is used with the microarray apparatus 100 of the present invention, a third dye would be used for control label 107 to specifically label the control target 109 that is complementary to the control probe or stilt 101. The third dye 107 would produce the control signal 108 when excited by light that is different from the red and green signals 115, 115'. The labeled control target 109 is included in the hybridization mixture with the reference test target 113 and experimental test target 113'. Alternatively, a third and fourth dye could be used, for example, for the control probe label 107a and the control target label 107b. The control signal 108 from the third dye 107 or the control signals 108a, 108b from the third and fourth dyes 107a, 107b would be different from each other and different from the red and green signals 115, 115' from the CY3 and CY5 dye test labels 114, 114' on the test target samples 113, 113'. Moreover, a test label 114 either directly on the oligomer test probe 112 or on the test target 113; a test label 114a, 114b respectively directly on both the oligomer test probe 112 and the test target 113; or a test label 114, 114' respectively directly on different groups of the test target sample 113, 113', or any variation or combination thereof, are all within the scope of the present invention. Unless otherwise stated herein, for simplicity the test label "114" includes one or more of the test labels 114a, 114b, 114'; the test signal "115" includes one or more of the test signals 115a, 115b, 115'; the control signal "108" includes one or both of the control signals 108a, 108b; and the control label "107" includes one or both of the control labels 107a, 107b. The hybridized control probe or stilt 110 will emit the control signal 108 indicative of the control label 107. The hybridized test probe 120 will emit the test signal 115 indicative of the test label 114. The microarray scanner will separately detect each different signal in any of the variations or combinations described above for the control signals 108 and the test signals 115. The control signal 108 is detected separately, preferably in separate control detection channel(s), from the detection channel(s) conventionally used for detection of the test signal 115 emitted from the hybridized test probe 120.

Figure 4:
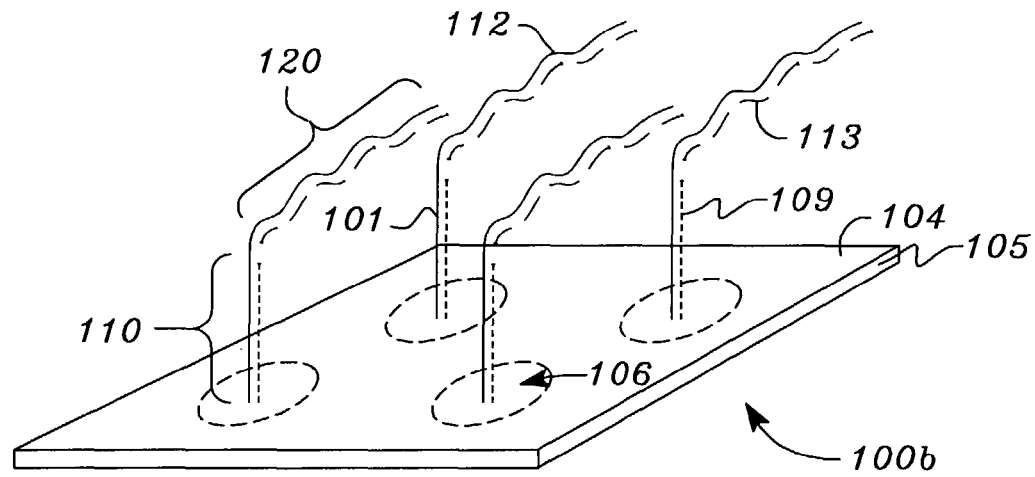
FIG. 4 illustrates a partial perspective view of a hybridized microarray using the apparatus of FIG. 2.
Figure 5:
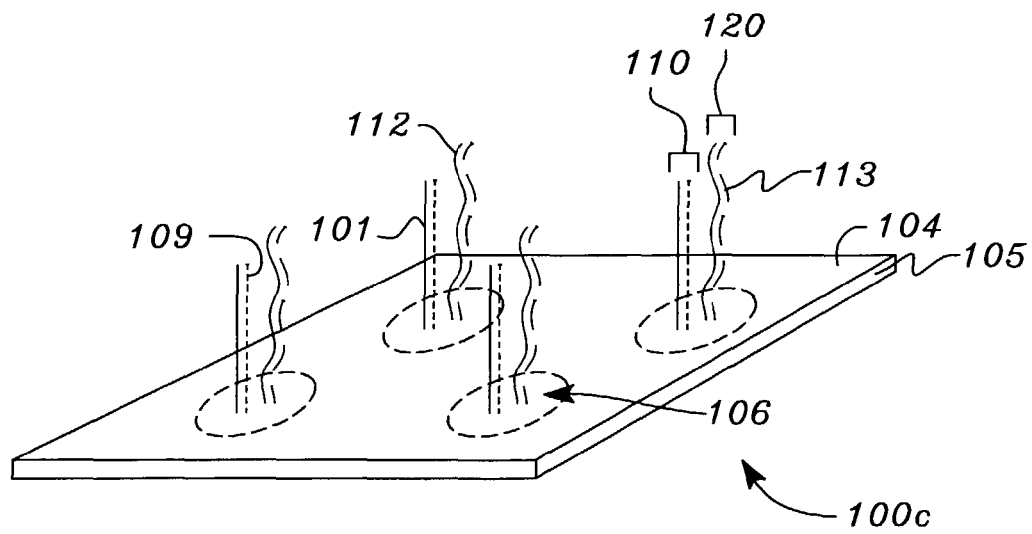
FIG. 5 illustrates a partial perspective view of a hybridized microarray using the apparatus of FIG. 3.

FIGS. 4 and 5 illustrate the microarray apparatus 100 after hybridization. FIG. 4 illustrates embodiment 100b of FIG. 2 after hybridization. FIG. 5 illustrates embodiment 100c of FIG. 3 after hybridization. The control target 109 is illustrated as a short-dash dashed line adjacent to the control probe or stilt 101 (illustrated as a solid straight line) and the test target 113 is illustrated as a relatively longer-dash dashed line adjacent to the oligomer test probe 112 (illustrated as a solid wavy line). FIGS. 4 and 5 do not illustrate the control label 107 or control signal 108, for simplicity. All of the ways of labeling the control probe or stilt 101 with the control label 107 described above are applicable to FIGS. 4 and 5. Also not shown in FIGS. 4 and 5, is that the hybridized test probe 120 is labeled with the test label 114 that emits the test signal 115. Preferably, the test label 114 is attached to or associated with the test target sample 113, as mentioned above. However, all of the ways of labeling the oligomer test probe 112 with the test label 114 described above are applicable to FIGS. 4 and 5.

When the control label 107 is indirectly associated to the control probe or stilt 101 by hybridization along with the labeled test target 113 to the oligomer test probe 112, advantageously the hybridization data for every feature 106 can be directly normalized on the microarray 105 for various signal trends (global or local) across the array. For example, the typical signal gradients found across an array due to oligomer test probe hybridization anomalies and/or due to scanner focusing problems can be compensated for, since each feature 106, has a control-specific target signal 108 as a "reference" that is detected in the separate channel of the scanner. The hybridization data from this separate control channel can be compared to and normalized with the hybridization data from the conventional test detection channels.

All of the embodiments of the apparatus 100 described above can precisely detect the location of every feature 106 on the array by scanning for the control signal 108 from the control-specific label 107 in a different channel of the scanning equipment, preferably independently of the channels conventionally used for scanning the test signals 115 from the hybridized oligomer test probes 120. The present invention provides a novel apparatus 100 and methods for enhanced feature 106 detectability, which preferably uses additional color channels available on a four-channel microarray scanner in conjunction with creating a microarray apparatus 100 of control probes or stilt 101 and oligomer test probes 112, preferably on the control stilts 101. Therefore, the location of every feature 106 is known, regardless of the quality of the test signal 115 from the hybridized oligomer test probes 120. The additional control signal 108 data in the separate channel is used to assist in feature 106 location and feature extraction, especially for low or dim hybridized oligomer test probes 120 signal. Further, the additional signal 108 data provide a means for normalizing each feature 106 for its extremely local hybridization and scanning characteristics. By "extremely local", it is meant that the local area of each feature 106 itself is considered in the analysis, because each feature 106 comprises the control probe or stilt 101 and the oligomer test probe 112. Advantageously, the data is normalized for the feature 106 itself and not normalized by some average over many separate dedicated control features, as is conventionally done. In other words, the signal values can be adjusted for the precise location of the feature as well as precise feature-local hybridization variations, rather than using a less localized sampling of surrounding background or other dedicated feature-control probes, as is used in the conventional analysis methods.

FIG. 4 illustrates the preferred embodiment 100b of the apparatus 100 of the invention after hybridization with a hybridization mixture comprising control-specific targets 109 of known composition and the test target material 113. The preferred embodiment 100b illustrated in FIG. 4 provides for a 1:1 correlation between the quantity of control stilt 101 and the quantity of oligomer test probes 112. In the preferred embodiment of FIG. 4, as well as the embodiment 100c illustrated in FIG. 5, the control signal 108 from the hybridized control probe 110 provides information about the location of each feature 106, while the separate test signals 115 from the hybridized test probes 120 yield information about the quality and quantity of the hybridization of test target 113 to the test probes 112 at each feature 106.

Figure 6:
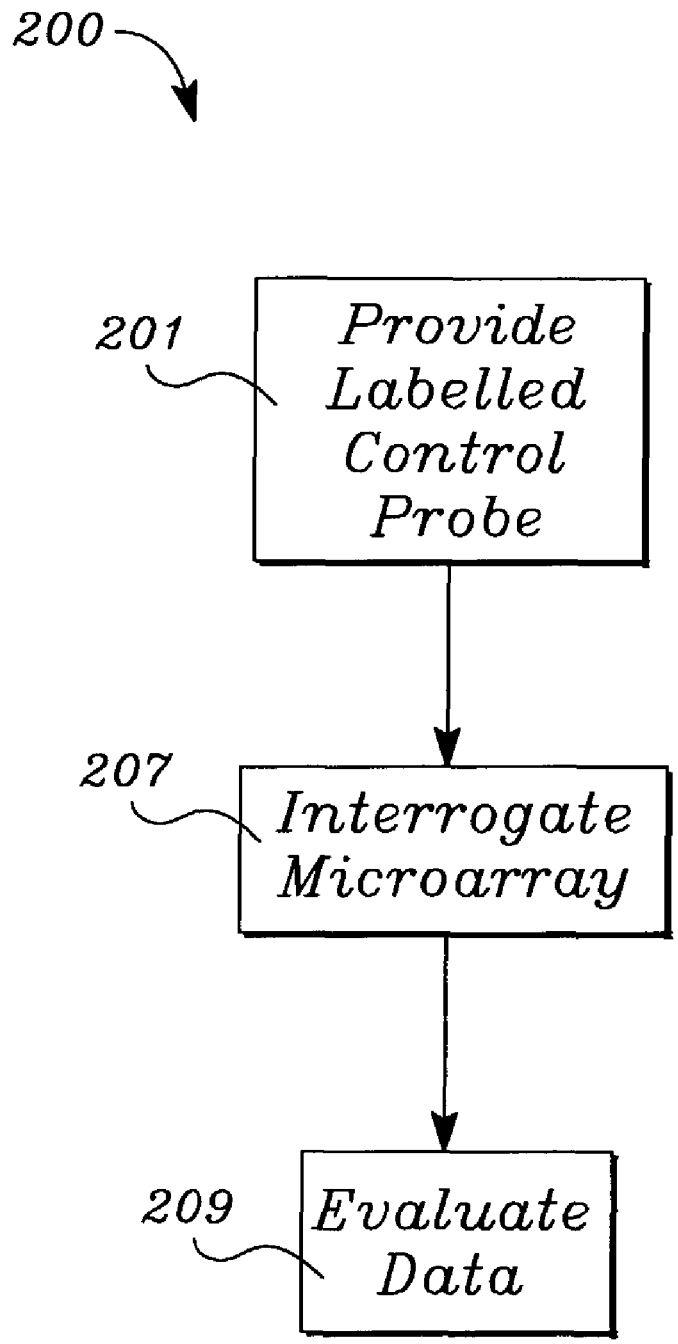
FIG. 6 illustrates a block diagram of one method of the present invention.

The present invention also includes a method 200 of performing a non-destructive quality control evaluation of the features on a microarray. The method 200 is illustrated in FIG. 6. The method 200 comprises the step of providing 201 a labeled control probe 101 on a surface 104 of a microarray substrate 105 in an array pattern of features 106, wherein the control label 107 for the control probe 101 emits a control signal 108 when exposed to light. The method of performing further comprises the steps of interrogating 207 the populated microarray substrate 105; and evaluating 209 data acquired from the interrogation before further use of the populated microarray substrate 105. The step of interrogating 207 comprises the steps of scanning 210 the microarray with a light; and detecting 220 the control signal 108 from the labeled control probe at each feature location 106. The control signal 108 from the control probe label 107 is detected in a control detection channel of a scanning system. This method 200 is particularly useful for the non-destructive quality control evaluations of microarray substrates 105 before populating the substrate 105 with oligomer test probes 112, or even after the oligomer test probes 112 are added, but before performing hybridization experiments. Where the oligomer test probe 112 is populated on the substrate 105, a directly labeled oligomer test probe 112 would provide even more quality control data about the populated microarray substrate 105 for evaluation 209 after the interrogation 207. In the step of evaluating 209, the data acquired from the quality control interrogation can be used for modifying subsequent depositions, such as making an adjustment to the alignment of the deposition equipment before the oligomer test probes 112 are added, for example. Alternatively, the quality control data acquired during the interrogation can be forwarded to a user of the microarray apparatus 100, as defined above, to assist the user in evaluation of hybridization test results.

Figure 7:
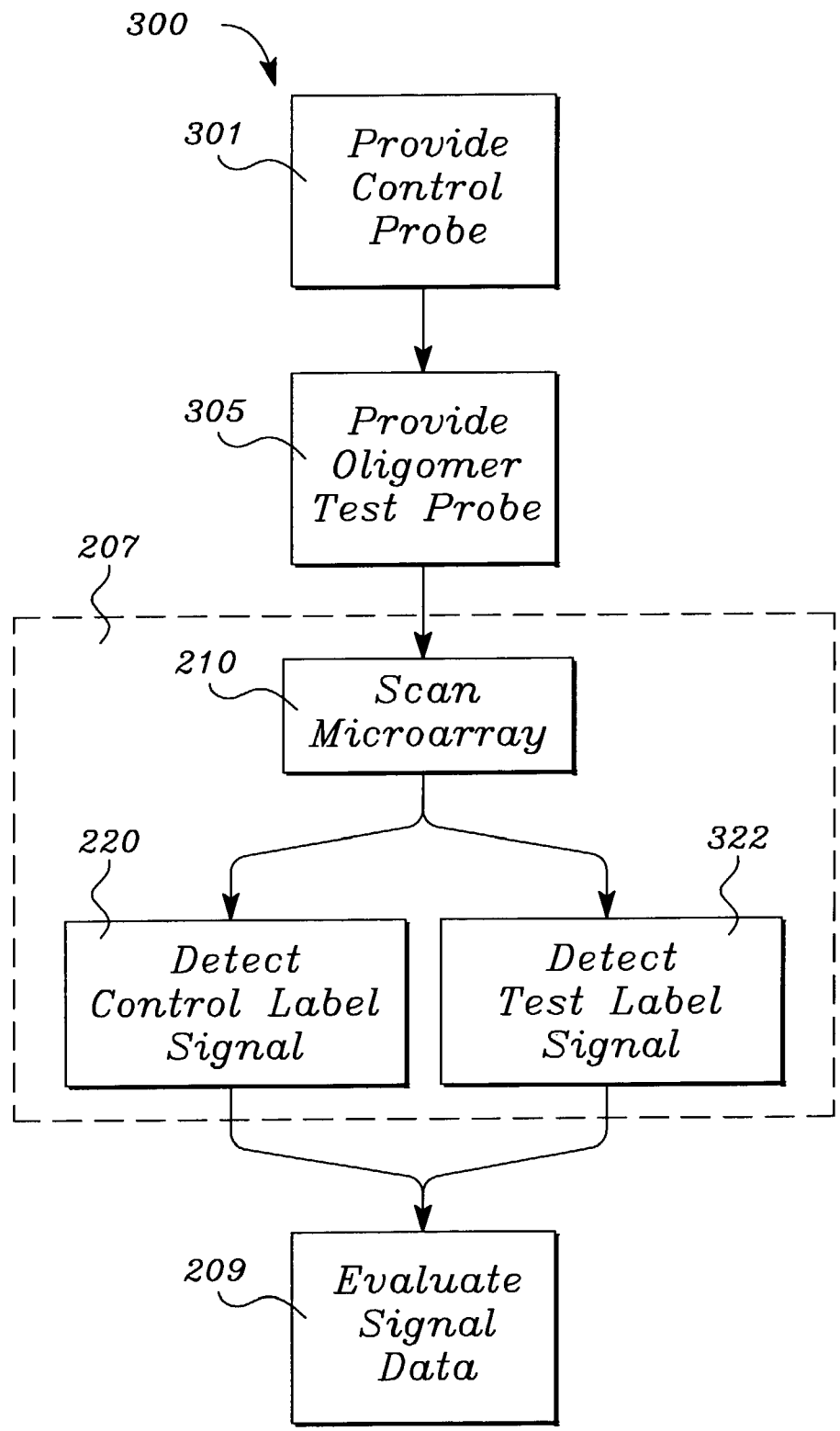
FIG. 7 illustrates a block diagram of another method of the present invention.

In still another aspect of the present invention, a method 300 of detecting each feature on a microarray is provided. The method 300 is illustrated in FIG. 7. The method 300 comprises the step of providing 301 a control probe 101 on a surface 104 of a microarray substrate 105 in an array pattern of features 106, wherein the control probe 101 is associated with a control label 107 that emits a control signal 108, and wherein the control probe 101 is attached at one end 102 to the surface 104. The method 300 further comprises the step of providing 305 an oligomer test probe 112 to each feature location 106. The method 300 still further comprises the steps of interrogating 207 the microarray 100 with a microarray scanner to detect the control signal 108; and evaluating 209 data collected from the detected control signal 108. The oligomer test probe 112 is associated with a test label 114 that emits a test signal 115 that is different from the control signal 108. When the oligomer test probe 112 is associated with the test label 114, the step of interrogating 207 comprises scanning 210 the microarray 100 with a light to excite the labels 107, 114; and detecting 220 the control signal 108, and further comprises the step of detecting 322 the test signal 115 from the test label 114 separately, preferably in a separate test detection channel from the control channel of the scanning system. The method 300 is particularly useful for detecting all features on the array, regardless of the quality or quantity of the test signal 115 at each feature location 106, by detecting 220 the control signal 108 from the control probe 101 at each feature location 106.

Figure 8:
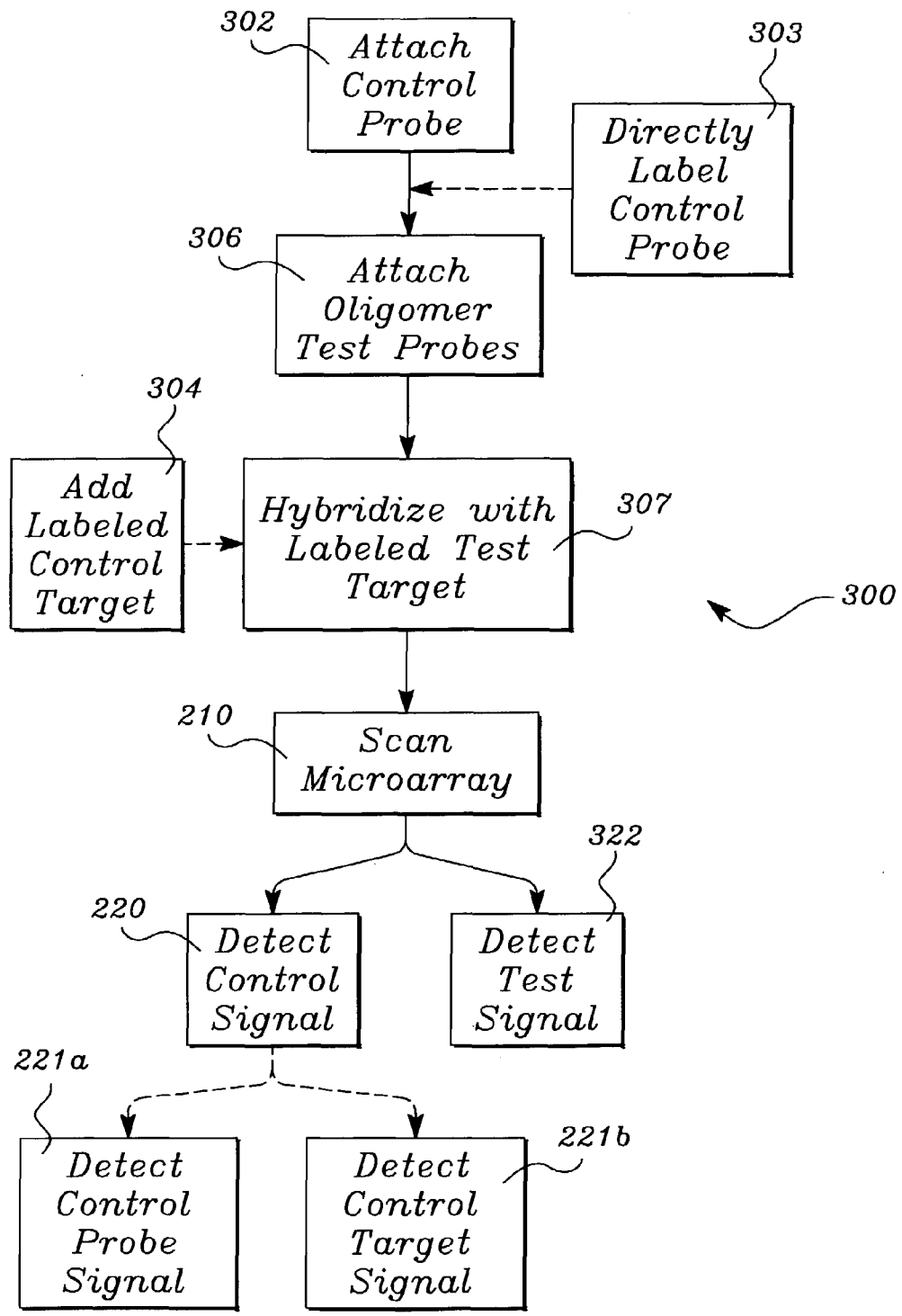
FIG. 8 illustrates a block diagram of several embodiments of the method of FIG. 7.

In accordance with the method 300, as illustrated in FIG. 8, the step of providing 305 the oligomer test probe 112 preferably comprises the step of attaching 306 the oligomer test probes 112 at the feature locations 106; and indirectly associating the test label by hybridization. Therefore, in one embodiment, before the step of interrogating 207, the method 300 further comprises the step of exposing 307 the microarray 100 to a hybridization solution comprising the test or experimental target sample 113 that comprises the test label 114.

However, it is within the scope of the invention to directly label the oligomer test probes 112 instead of, or in addition to, labeling the test target sample 113. The control signals 108 collected from the control detection channel and the test signals 115 collected from the separate test detection channel of the scanning system together are used to locate the features containing hybridized oligomer test probes 120 based on the locations of all features 106. The method 300 is particularly useful for detecting all features regardless of the quality and quantity of the hybridization at each feature 106 and more importantly, regardless of the strength of the target-specific test signal 115 at each feature 106.

The step of providing 305 the oligomer test probes 112 to the features 106 preferably comprises the step of attaching 306 the oligomer test probe to an opposite end 103 of the control probe 101, such that the control probe functions as a control stilt 101 that extends between the surface 104 of the substrate 105 and the oligomer test probe 112. As mentioned above, this embodiment advantageously provides a 1:1 correlation between the quantity of control probe and the quantity of oligomer test probes in each feature. Alternatively, the oligomer test probe can be provided 305 by attaching 306 one end of the oligomer test probe to the surface 104 of the microarray substrate 105 within each feature 106 along with the control probe 101.

In the method 200 of performing a non-destructive quality control evaluation of a microarray of features, the step of providing 201 a labeled control probe comprises the step of adding the control probe 101, having a directly associated control label 107, to the surface 104 of the microarray substrate 105. However, in the method 300, the control probe 101 may be labeled in one of three ways. In one way, the step of providing 301 a control probe comprises the step of attaching 302 the control probe, having a directly associated 303 control label 107, as in method 200. Alternatively, the step of providing 301 comprises the steps of attaching 302 an unlabeled control probe 101 to the surface 104 of the substrate 105, and indirectly associating 304 the control label 107 to the control probe 101 by hybridization 307, when the control probe 101 is exposed to the above-mentioned hybridization solution that further comprises the complementary control target 109 that has the control label 107. Still alternatively, the step of providing 301 comprises the steps of attaching 302 the control probe 101 having both a directly associated 303 control probe label 107a and indirectly associating 304 a control target label 107b by hybridization 307, as described above. Again preferably, the control targets 109 are hybridized 307 at the same time as the test target sample 113. However, it is within the scope of the invention for the control targets 109 to be hybridized separately from the test target material 113. In this alternative embodiment, the control label 107 comprises a control probe label 107a that emits a control probe signal 108a and a control target label 107b that emits a different control target signal 108b. Moreover, the step of detecting 220 further comprises the steps of detecting 221a the control probe signal 108a in a control channel and separately detecting 221b the control target signal 108b, preferably in a separate control channel of the scanning system. This alternative embodiment is particularly useful for providing the capacity for non-destructive quality control analysis prior to hybridization 307, by first interrogating the microarray 100 before the oligomer test probe 112 is indirectly associated with the test label 114. The first interrogation is used to detect the control signal 108a from the control probe label 107a. Also, this alternative embodiment is particularly useful for providing post-hybridization feature location, feature extraction, normalization of the hybridization data, and hybridization/ scanning detrending, by subsequently interrogating 207 the microarray 100 after hybridization 307 and separately detecting the control signal 108b from the control target label 107b and the test signal 115 from the test label 114. FIG. 8 illustrates the preferred and/or alternative embodiments of method 300, wherein the alternative labeling steps 303, 304 of the control probe or stilt 101 are illustrated via dash arrows and the detection steps 221a, 221b of the separate control signals 108a, 108b, respectively, are illustrated via dashed arrows.

Directly labeling 303 the control probe 101 with a control label 107 is preferred for the method 200 and in the latter described alternative embodiment in the method 300, because it provides the opportunity to do non-destructive quality control analysis of the microarray independently of hybridization. Such quality control information can be used in place of, and in all of the same ways as, the camera or sensor acquired quality control information is used in copending U.S. patent application Ser. No. 09/302,898 titled "POLYNUCLEOTIDE ARRAY FABRICATION", and copending U.S. patent application Ser. No. 09/558,532 titled "ARRAY FABRICATION WITH DROP DETECTION" (both incorporated herein by reference). Of course, the camera or sensor acquired information in those applications can be replaced with array quality information (whether nominal or actual) acquired through any means. For method 200, when the control probe or stilt 101 is directly labeled 303, hybridization with a control target 109 is not necessary to produce a control signal 108. Thus, the directly labeled control probe or stilt 101 need not have a complementary control target 109, as provided conventionally. However, the directly labeled control probe sequence 101 is still chosen such that it functions as a control or reference that does not hybridize or interfere with the target sample under test. Moreover, unlike indirectly labeled control probes or stilts 101, directly labeled control probes or stilts 101 are used for precise feature location during feature extraction after hybridization, but their use does not provide any normalization data related to hybridization.

In the alternative embodiments of the method 300 mentioned above where the control probe or stilt 101 is indirectly associated 304 with the control label 107, preferably by hybridization 307, the labeled control target 109 may be hybridized with the control probes or stilts 101 before, after, or preferably at the same time that, the test target sample 113 is hybridized 307 with the oligomer test probes, thereby requiring only one hybridization step 307. Moreover, by adding 304 labeled control targets 109 to the hybridization mixture and hybridizing 307 the labeled control targets 109 at the same time as the labeled test target sample 113 is hybridized 307, the hybridization data can be normalized.

After hybridization 307 and interrogation 207, the standard red and green channels of the microarray scanner can be used for detection of test signals 115, as in a typical experiment (described above), while at least one separate control channel is used to detect only control-related signals 108. Where there is a separate control probe signal 108a and a separate control target signal 108b, preferably the scanner would have two separate control channels to separately detect the control signals 108a, 108b. A four-channel microarray scanner works particularly well with the embodiment having two separate control signals 108a, 108b, and more particularly, for the embodiment where there are two separate control signals 108a, 108b and two separate test signals 115 (selected from 115, 115', 115a and 115b). However, as mentioned above, a two-channel microarray scanner will work for the invention also.

After the step of scanning 210, the microarray apparatus 100 produces a control signal 108 detected in the control channel(s) for each and every feature 106 on the array substrate 105. Advantageously, a control signal 108 for every feature 106 assists feature location (particularly for low or dim test signals from features), but perhaps more importantly, a control signal 108 from a hybridized control probe 110 provides a means of normalizing each feature 106 for its extremely local hybridization and scanning characteristics.

In a method 400 of making the microarray apparatus 100 with enhanced feature detectability, that is used in methods 200, 300 and in methods 600, 700 (described below) of the invention, the control probes may be provided 201, 301 by presynthesizing the control probes 101 and depositing or immobilizing 302 the whole oligomer/cDNA on the surface 104 of the substrate 105 in the array pattern of features 106 using conventional well-known techniques of presynthesis, deposition and immobilization on the surface. Alternatively, the control probes 101 may be provided 201, 301 by synthesizing the control probes 101 on the substrate 105 in situ using conventional well-known techniques of in situ synthesis. Likewise, the oligomer test probes 112 may be provided 305 by presynthesizing and depositing or attaching 306 whole oligomers/cDNA, or otherwise by synthesizing the oligomer test probes 112 in situ using conventional methods. The oligomer test probes 112, whether presynthesized or in situ synthesized, can be attached to the surface 104 of the substrate 105 or attached to the opposite end 103 of the control probe 101 within each feature location 106. In a preferred embodiment, the control probes 101 are presynthesized and deposited 302 as whole control probes 101 onto the surface 104 of the microarray substrate 105 and the oligomer test probes 112 are synthesized in situ, either on the surface 104 of the substrate 105, or more preferably, on the opposite end 103 of the control probe 101. Thus, in the more preferred embodiment of the method 400 of making the microarray apparatus 100, the microarray is manufactured by depositing whole or presynthesized oligomers in the form of the control stilts 101 onto each feature 106 in addition to synthesizing the oligomer test probes 112 in situ to the opposite end 103 of the presynthesized control stilt 101.

In practice, the concentrations of the whole oligomer controls 101 versus concentration of in situ oligomer test probe 112 can be determined, without undue experimentation by one skilled in the art. This more preferred embodiment of method 400 could be manufactured faster, since the presynthesized control stilt 101 could be deposited on each feature 106 by a single fire of a dedicated inkjet nozzle, thus reducing the number of cycles needed to synthesize the combined control stilt 101 and in situ oligomer test probe 112. In other words, a single pass of the inkjet writer could deposit control stilts 101 on all features 106 and subsequent passes of the inkjet writer could be used to synthesize in situ just the oligomer test probes 112 on the free (unattached) end 103 of each control stilt 101. The control stilt 101 is not "capped" at the free unattached end 103 in this embodiment, such that the oligomer test probe 112 is added to the uncapped free end 103 via in situ synthesis to gain the manufacturing benefits of depositing presynthesized control probes 101 as the first synthesis step in the in situ synthesis of the oligomer test probes 112.

To better emphasize the manufacturing benefit mentioned above, consider for example, the control stilt 101 being a sequence of 15 monomers and the oligomer test probe 112 being a sequence of 25 monomers. Using in situ synthesis of both control and test probes 101, 112, would be equivalent to synthesizing an oligomer having a 40-monomer sequence on each feature 106 of the microarray substrate 105. According to the more preferred method of making 400, if the 15-monomer sequence control stilt 101 is deposited as a presynthesized control sequence, then only the 25-monomer sequence oligomer test probe 112 needs to be synthesized in situ to the end 103 of the presynthesized 15-monomer control stilt 101. This more preferred method 400 is the equivalent (in time and labor) of simply manufacturing a sequence of 26 monomers on the array instead of the 40-monomer sequence. This is a substantial savings in the time it takes to manufacture the microarray apparatus 100.

In another aspect of the invention, a kit 500 comprising the microarray apparatus 100 and instructions for using the apparatus 100 is provided. The kit is useful for evaluating a test target sample 113. The apparatus 100 of the present invention is populated with control probes or stilt 101 and oligomer test probes 112, as described above, for any of the embodiments 100a, 100b, 100c. In one embodiment of the kit 500, the control probes or stilts 101 are directly labeled with a control label 107. In another embodiment, the control probes or stilts 101 are not labeled directly. The user would specify whether non-destructive quality control capability, or actual quality control data, for the enclosed microarray apparatus 100, be provided. When quality testing is specified, directly labeled control probes or stilts 101 on the microarray 100 are provided.

The kit 500 further comprises a control-specific target material 109 having a control label 107. The control target 109 is complementary to the control probe or stilt 101 sequence and is used by the kit-user during hybridization experiments. The control label 107 associated with the control probe or stilt 101 enhances feature detectability so that the user can better and more accurately locate experimental or test hybridization signals 115 emitted at each feature 106 on the microarray 100. The user may either mix the complementary, control-specific target 109 with the user's experimental target sample 113 under evaluation and perform one hybridization step 307, or separately hybridize the control target 109 to the control probes or stilts 101 and the test target 113 to the oligomer test probes 112 at the user's discretion. When mixed in a hybridization solution and hybridized to the microarray 100 at the same time, advantageously, the kit 500 provides the user the ability to normalize the hybridization data using the control signals 108 and the test signals 115. In another embodiment of the kit 500, the oligomer test probes 112 on the microarray 100 can be provided as directly labeled with a test probe label 114. The instructions included with the kit 500 inform the user of the control labeling system 107 used in the kit 500 and the particular control signals 108 (or spectral range) that the control labels 107 will generate. If a directly labeled oligomer test probe 112 is provided, the instructions will inform the user of the spectral range of the test signal 115 emitted from the provided test label 114. To distinguish from the control signals 108 and the test signal 115 (if provided), the user should use a test target label on the test target sample 113 that produces a test target signal that can be separately detected from the control signals 108 produced by the control labels 107 and the test signals 115 provided by the test label 114, provided in the kit 500.

The apparatus 100 of the invention is used to evaluate polynucleotide or oligonucleotide test target samples 113. A user will expose the apparatus 100 to one or more fluorescent-labeled test target samples 113, such as in hybridizing or binding assays, and interrogate 207 the array apparatus 100 following such exposure using well-known conventional methods. The interrogation will produce a result. Information about the test target sample(s) 113 can be obtained from the results of the interrogation. Interrogation is usually accomplished by a suitable scanner, as described above, which can read or detect 220, 322 the location and intensity of fluorescence (signals 108, 115) at each feature 106 of the array 100. For example, such a scanner may be similar to the GENEARRAY scanner available from Hewlett-Packard, Palo Alto, Calif. Results from the interrogation 207 can be processed results 209, such as that conventionally obtained by rejecting a reading for a feature which is below a predetermined threshold and/or forming conclusions based on the pattern read from the array (such as whether or not a particular target sequence may have been present in the sample), or the results obtained using the enhanced feature detection capability of the present invention, such that the location of each feature 106 is known with substantial certainty and the known locations are compared to the locations of test signals 115 (whether dim or bright) detected from hybridized oligomer test probes 120.

As used herein, the term "user" means an individual, a company or other organization, or an employee, consultant, independent contractor, officer, director, or the like, thereof, and includes an agent of the user, which includes a parent or subsidiary organization of the user or of the agent, a contractor, a subcontractor, a customer, or a vendor of the user or the agent, or the like, for example, who may directly or indirectly benefit from the use of the apparatus 100 or the information obtained from using the apparatus 100 of the present invention. Also, one or more of the users may be the manufacturer of the apparatus 100 and still be within the scope of the invention. One user might perform the hybridization assay 307, while another user might perform the interrogation 207 at a location remote to the hybridization location. The results of the interrogation 207 (processed 209 or not) can be forwarded (such as by communication) back to the first-mentioned user, or to another remote location if desired, and received there for further use by the first or second user or still another user. Moreover, the user(s) may be in a location(s) remote to the location where the apparatus 100 is fabricated 400. A user may communicate or forward the results, or the information obtained from the results, to a location remote to the user's location and still be within the scope of the present invention. A location is "remote" if it is at least a different location, including but not limited to, a different room in a building, a different building, a different city, different state or different country, or if the location is at least one, at least ten, or at least one hundred miles apart, for example. "Communicating" information means transmitting the data representing that information as electrical signals over a suitable communication channel (for example, a private or public network). "Forwarding" information refers to any means of getting that information from one location to the next, whether by physically transporting that information or otherwise (where that is possible) and includes, at least in the case of data, physically transporting a medium carrying the data or communicating the data.

In still another aspect of the invention, a method 600 of detecting hybridized features comprises the steps of providing the microarray apparatus 100 of the present invention according to any of the embodiments 100a, 100b or 100c; and providing a labeled control target material 109, both preferably in the kit 500 of the invention, to a user to perform a hybridization assay with a test target sample 113. Depending on the embodiment, the control probes or stilts 101 on the microarray apparatus 100 may be directly labeled 303. In one embodiment, before the step of providing the microarray 100 to the user, the method 600 comprises interrogating 207 the microarray 100 to obtain quality control data. In this embodiment, the method 600 may further comprise providing the quality control data to the user.

After the user receives the kit 500, the method 600 further comprises the step of the user performing a hybridization assay 307 using the microarray 100 and a hybridization solution comprising the test target sample 113. Depending on the embodiment, the user may choose to include the labeled control target 109 from the kit 500 in the hybridization solution. The hybridized oligomer test probes 120 on the microarray 100 are associated with a test label 114 that emits a test signal 115 when excited by light which is different from the control signals 108 produced by the control labels 107 associated with the control probes or stilts 101, 110. The test label 114 may be included in the kit 500 upon request, or may be provided by the user. After the step of hybridization 307, the method 600 further comprises the step of the user interrogating 207 the hybridized microarray 100 with a microarray scanner. In the step of interrogating 207, test signals 115 are detected 322 and data collected in a test channel of the microarray scanner and control signals 108 are detected 220 and data collected in a control channel of the scanner. The data is then analyzed 209 for the user to determine characteristics of the test target sample 113. In one embodiment, after the data is collected, the method 600 further comprises transmitting all or part of the data to a location where it is received, and possibly used or analyzed 209. All of these steps of method 600, whether performed by the user or one or more agents thereof, are within the scope of the present invention. As mentioned above, one or more of the locations where the assay is performed 307, where the interrogation 207 is done, where the data is analyzed 209, where the data is transmitted and where it is received may be the same location or remote from the others and still be within the scope of the invention.

In yet still another aspect of the invention, a method 700 of locating hybridized features on a microarray using a microarray scanner is provided. The method 700 uses a typical microarray comprising oligomer test probes in an array pattern of features on a substrate. The oligomer test probes are for hybridizing with a target sample under test at one or more of the features. The hybridized oligomer test probes are labeled with the test label that emits the test signal when excited with a light from the scanner. The method 700 of the invention comprises the step of providing 301 a control probe 101 to a surface of the substrate at each feature location, such that each feature comprises the control probe 101 and the oligomer test probe. The control probe 101 is provided preferably before the oligomer test probes are hybridized with the test target sample. The method 700 further comprises the step of associating a control label 107 with the control probe 101. The control label 107 emits a control signal 108 when excited with the light that is different from the test signal. The step of associating may comprises either directly labeling 303 the control probe 101, indirectly labeling 304 the control probe by hybridization with a control-specific target material 109 that comprises the control label 107, or both the steps of directly labeling 303 and indirectly labeling 304. In the embodiments where the method 700 comprises the step of indirectly labeling 304, the control-specific target material 109 is hybridized 307 to the control probe 101 preferably at the time the test target sample is hybridized to the oligomer test probes. The method 700 still further comprises the step of interrogating 207 the microarray with the microarray scanner to locate the hybridized oligomer test probes by detecting the control signals 108 at each feature and separately detecting the test signals from the hybridized oligomer test probes on the one or more features.

The apparatus 100 and methods 200, 300, 400, 600, 700 and the kit 500 containing the apparatus 100 of the present invention have at least the following advantages. If the control probe or stilt 101 is hybridized against a known control target 109 at the same time the test probe 112 is hybridized with the test target 113, then advantageously every feature 106 can be directly normalized for various signal trends (global or local) across the array. So signal gradients across the array due to hybridization anomalies or scanner focus problems can be compensated since each probe or stilt 101 has a "reference" control signal 108 (separately detectable, preferably in another channel) to compare to and normalize with.

Further, all feature locations 106 are available for "probing target" (i.e., for hybridizing oligomer test probes 112 with test target samples 113), rather than dedicating some percentage of the features 106 to function as control features only, as is found in some conventional methods. This increases the useful capacity of the microarray 100. Still further, if a control probe or stilt 101 is labeled directly with a control label 107, then some degree of non-destructive quality control can be performed on a substrate 105 prior to hybridization by simply scanning in the channel appropriate for the control signal 108 from the labeled control probe or stilt 101. And last but not least, whole oligomer deposition of the control probe or stilt 101 can be used to increase manufacturing throughput.

Thus there have been described several embodiments of a novel microarray apparatus 100 with enhanced feature detectability, methods 200, 300, 600, 700 of feature detection on the microarray 100, a method of making 400 the microarray 100 and a kit 500 comprising the microarray apparatus 100, used for hybridization experiments or assays. It should be understood that the above-described embodiments are merely illustrative of the some of the many specific embodiments that represent the principles of the present invention. Clearly, those skilled in the art can readily devise numerous other arrangements without departing from the scope of the present invention.

What is claimed is:

1. A method of performing a nondestructive quality control evaluation of a microarray comprising:
   providing a labeled control probe to a plurality of feature locations on the surface of a microarray substrate, the labeled control probe on the microarray emitting a control probe signal when excited by a light;
   locating each feature location of said plurality of feature locations by detecting the control probe signal at each feature location of said plurality of feature locations, wherein said locating comprises interrogating the microarray;
   evaluating data acquired from the interrogation, wherein evaluating comprises using the data acquired for modifying a subsequent deposition; and
   subsequently depositing an oligomer test probe to each of said feature locations of the microarray based on the acquired data, such that a feature comprising the labeled control probe and the oligomer test probe is provided at each feature location.

2. The method of claim 1, further comprising after subsequently depositing:
   forwarding the data acquired to a user of the microarray to assist the user in evaluating assay results of a hybridization assay subsequently performed by the user.

3. The method of claim 2, further comprising:
   subsequently performing the hybridization assay on the microarray with a labeled test target using the acquired data, such that hybridized oligomer test probes are produced on one or more features, the hybridized oligomer test probes being indirectly associated with a test target label that emits a test target signal when excited by the light, the test target signal being different from the control probe signal.

4. The method of claim 2, further comprising interrogating the microarray after subsequently performing the hybridization assay to obtain the assay results, wherein interrogating comprises:

SEQUENCE LISTING

<160> NUMBER OF SEQ ID NOS: 2

<210> SEQ ID NO 1
<211> LENGTH: 25
<212> TYPE: DNA
<213> ORGANISM: Artificial Sequence
<220> FEATURE:
<223> OTHER INFORMATION: synthetic probe

<400> SEQUENCE: 1
atcatcgtag ctggtcagtg tatcc                                   25

<210> SEQ ID NO 2
<211> LENGTH: 25
<212> TYPE: DNA
<213> ORGANISM: Artificial Sequence
<220> FEATURE:
<223> OTHER INFORMATION: synthetic probe

<400> SEQUENCE: 2 acagggagt gatctatggt ggagt                                    25 scanning the microarray with a microarray scanner to excite the labels;

collecting the control probe signal in a control detection channel; and collecting the test target signal in a test detection channel that is separate from the control detection channel of a detection system of the microarray scanner, wherein the separately collected signals facilitate evaluation of the assay results.

5. The method of claim 2, wherein the oligomer test probe comprises a test probe label that emits a test probe signal when excited by a light, the test probe signal being different from the control probe signal and the test target signal.

6. The method of claim 5, further comprising interrogating the microarray after subsequently performing the hybridization assay to obtain the assay results, wherein interrogating comprises:

scanning the microarray with a microarray scanner to excite the labels;

collecting the control probe signal in a control detection channel;

collecting the test probe signal in a first test detection channel; and collecting the test target signal in a second test detection channel that is separate from the control detection channel and the first test detection channel of a detection system of the microarray scanner, wherein the separately collected signals facilitate evaluation of the assay results.

7. The method of claim 1, further comprising providing the microarray, a control target and the acquired data to a user, the control target being specifically complementary to the control probe, the control target comprising a control target label that emits a control target signal when excited by light, the control target signal being different from the control probe signal and the test target signal, and subsequently performing a hybridization assay on the microarray with the control target and a test target, the test target comprising a test target label that emits a test target signal when excited by light, each of the test target signal and the control target signal being different from each other and being different from the control probe signal.

8. The method of claim 7, further comprising interrogating the microarray after subsequently performing the hybridization assay to obtain the assay results, wherein interrogating comprises:

scanning the microarray with a microarray scanner to excite the labels;

collecting the control probe signal in a first control detection channel;

collecting the control target signal in a second control detection channel that is separate from the first control detection channel; and collecting the test target signal in a second test detection channel that is separate from the first test detection channel and the control detection channels, wherein the separately collected signals facilitate evaluation of the assay results.

9. The method of claim 7, wherein the oligomer test probe comprises a test probe label that emits a test probe signal when excited by a light, the test probe signal being different from each of the control probe signal, the control target signal and the test target signal.

10. The method of claim 9, further comprising interrogating the microarray after subsequently performing the hybridization assay to obtain the assay results, wherein interrogating comprises:

scanning the microarray with a microarray scanner to excite the labels;

collecting the control probe signal in a first control detection channel;

collecting the control target signal in a second control detection channel that is separate from the first control detection channel;

collecting the test probe signal in a first test detection channel separate from the control detection channels; and collecting the test target signal in a second test detection channel that is separate from the first test detection channel and the control detection channels, wherein the separately collected signals facilitate evaluation of the assay results.

* * * * *

UNITED STATES PATENT AND TRADEMARK OFFICE
CERTIFICATE OF CORRECTION

PATENT NO.        : 7,879,541 B2                                    Page 1 of 1
APPLICATION NO.   : 10/422163
DATED             : February 1, 2011
INVENTOR(S)       : Robert H. Kincaid It is certified that error appears in the above-identified patent and that said Letters Patent is hereby corrected as shown below:

In column 30, line 36, in Claim 4, delete "claim 2," and insert -- claim 3, --, therefor.

In column 31, line 10, in Claim 5, delete "claim 2" and insert -- claim 3, --, therefor.

Signed and Sealed this
Twenty-first Day of June, 2011

David J. Kappos
*Director of the United States Patent and Trademark Office*